US007142330B2

United States Patent
Takahashi et al.

(10) Patent No.: US 7,142,330 B2
(45) Date of Patent: Nov. 28, 2006

(54) IMAGE PROCESSING METHOD, IMAGE PROCESSING APPARATUS AND RECORDING MEDIUM

(75) Inventors: Hiroshi Takahashi, Kanagawa (JP); Etsuo Morimoto, Kanagawa (JP); Kazunari Tonami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/269,597
(22) Filed: Nov. 9, 2005

(65) Prior Publication Data
US 2006/0055980 A1 Mar. 16, 2006

Related U.S. Application Data

(62) Division of application No. 09/695,992, filed on Oct. 26, 2000, now Pat. No. 6,977,757.

(30) Foreign Application Priority Data

| Oct. 29, 1999 | (JP) | 11-309413 |
| Apr. 7, 2000 | (JP) | 2000-106451 |
| Apr. 7, 2000 | (JP) | 2000-106452 |

(51) Int. Cl.
*H04N 1/405* (2006.01)
*H04N 1/409* (2006.01)
*G06T 5/00* (2006.01)
(52) U.S. Cl. ............. 358/3.05; 358/2.1; 358/3.15; 358/3.26; 382/252; 382/270; 382/275
(58) Field of Classification Search ............. 358/1.9, 358/2.1, 3.03–3.06, 3.13–3.15, 3.26, 533–536, 358/3.21–3.22; 382/252, 270, 199, 275
See application file for complete search history.

(56) References Cited

U.S. PATENT DOCUMENTS

| 5,243,445 | A |   | 9/1993  | Koike et al. |
| 5,371,515 | A | * | 12/1994 | Wells et al. ............ 358/3.24 |
| 5,438,633 | A | * | 8/1995  | Ghaderi ............... 382/270 |
| 5,668,638 | A |   | 9/1997  | Knox |
| 5,917,614 | A |   | 6/1999  | Levien |

FOREIGN PATENT DOCUMENTS

| EP | 0 606 132  | 7/1994  |
| EP | 0 730 369  | 9/1996  |
| JP | 63234772 A | 9/1988  |
| JP | 1-147961   | 6/1989  |
| JP | 02253484 A | 10/1990 |
| JP | 3-34772    | 2/1991  |
| JP | 4-57476    | 2/1992  |
| JP | 2755307    | 3/1998  |
| JP | 2801195    | 7/1998  |
| JP | 11-252364  | 9/1999  |

* cited by examiner

*Primary Examiner*—Scott A. Rogers
(74) *Attorney, Agent, or Firm*—Oblon, Spivak, McClelland, Maier & Neustadt, P.C.

(57) ABSTRACT

An image processing method of quantizing multi-tone image data by an error diffusion method, includes the steps of a) detecting change of the image data; and b) oscillating cyclically in image space a threshold for the quantization in an oscillation range controlled according to the detection result of the step a).

4 Claims, 30 Drawing Sheets

| | | | | | | | |
|---|---|---|---|---|---|---|---|
| 136 | 144 | 104 | 96 | 88 | 160 | 120 | 128 |
| 80 | 152 | 192 | 184 | 176 | 168 | 112 | 72 |
| 88 | 160 | 120 | 128 | 136 | 144 | 104 | 96 |
| 176 | 168 | 112 | 72 | 80 | 152 | 192 | 184 |
| 136 | 144 | 104 | 96 | 88 | 160 | 120 | 128 |
| 80 | 152 | 192 | 184 | 176 | 168 | 112 | 72 |
| 88 | 160 | 120 | 128 | 136 | 144 | 104 | 96 |
| 176 | 168 | 112 | 72 | 80 | 152 | 192 | 184 |

FIG.7

| | | | | | | | |
|---|---|---|---|---|---|---|---|
| 133 | 138 | 113 | 108 | 103 | 148 | 123 | 128 |
| 98 | 143 | 168 | 163 | 158 | 153 | 118 | 93 |
| 118 | 148 | 123 | 128 | 133 | 138 | 113 | 108 |
| 158 | 153 | 118 | 93 | 98 | 143 | 168 | 163 |
| 133 | 138 | 113 | 108 | 103 | 148 | 123 | 128 |
| 98 | 143 | 168 | 163 | 158 | 153 | 118 | 93 |
| 118 | 148 | 123 | 128 | 133 | 138 | 113 | 108 |
| 158 | 153 | 118 | 93 | 98 | 143 | 168 | 163 |

FIG.8

| 130 | 132 | 122 | 120 | 118 | 136 | 126 | 128 |
| --- | --- | --- | --- | --- | --- | --- | --- |
| 116 | 134 | 144 | 142 | 140 | 138 | 124 | 114 |
| 118 | 136 | 126 | 128 | 130 | 132 | 122 | 120 |
| 140 | 138 | 124 | 114 | 116 | 134 | 144 | 142 |
| 130 | 132 | 122 | 120 | 118 | 136 | 126 | 128 |
| 116 | 134 | 144 | 142 | 140 | 138 | 124 | 114 |
| 118 | 136 | 126 | 128 | 130 | 132 | 122 | 120 |
| 140 | 138 | 124 | 114 | 116 | 134 | 144 | 140 |

FIG.9

| 128 | 128 | 128 | 128 | 128 | 128 | 128 | 128 |
| --- | --- | --- | --- | --- | --- | --- | --- |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

150Lpi,63.5° (8 × 8)
<FROM SHIFTING 4 × 4>

| 1 | 2 | -3 | -4 | -5 | 4 | -1 | 0 |
|---|---|---|---|---|---|---|---|
| -6 | 3 | 8 | 7 | 6 | 5 | -2 | -7 |
| -5 | 4 | -1 | 0 | 1 | 2 | -3 | -4 |
| 6 | 5 | -2 | -7 | -6 | 3 | 8 | 7 |
| 1 | 2 | -3 | -4 | -5 | 4 | -1 | 0 |
| -6 | 3 | 8 | 7 | 6 | 5 | -2 | -7 |
| -5 | 4 | -1 | 0 | 1 | 2 | -3 | -4 |
| 6 | 5 | -2 | -7 | -6 | 3 | 8 | 7 |

FIG.17

| a | b | c | d | e |
|---|---|---|---|---|
| f | g | h | i | j |
| k | l | * |   |   |

FIG.18

| -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

| -1 | -1 | -1 | -1 | -1 |
|----|----|----|----|----|
| -1 | -1 | -1 | -1 | -1 |
| 0 | 0 | 0 | 0 | 0 |
| 1 | 1 | 1 | 1 | 1 |
| 1 | 1 | 1 | 1 | 1 |

| -1 | -1 | -1 | -1 | 0 |
|----|----|----|----|---|
| -1 | -1 | -1 | 0 | 1 |
| -1 | -1 | 0 | 1 | 1 |
| -1 | 0 | 1 | 1 | 1 |
| 0 | 1 | 1 | 1 | 1 |

| 0 | 1 | 1 | 1 | 1 |
|---|---|---|---|---|
| -1 | 0 | 1 | 1 | 1 |
| -1 | -1 | 0 | 1 | 1 |
| -1 | -1 | -1 | 0 | 1 |
| -1 | -1 | -1 | -1 | 0 |

FIG.19

| -1 | 0 | 1 | 2 |
|----|---|---|---|
| -2 | -7 | -6 | 3 |
| -3 | -4 | -5 | 4 |
| 8 | 7 | 6 | 5 |

FIG.20

150Lpi,63.5DEGREES(8 × 8)
<FROM SHIFTING 4 × 4>

| 1,  | 2,  | -3, | -4, | -5, | 4,  | -1, | 0   |
|-----|-----|-----|-----|-----|-----|-----|-----|
| -6, | 3,  | 8,  | 7,  | 6,  | 5,  | -2, | -7  |
| -5, | 4,  | -1, | 0,  | 1,  | 2,  | -3, | -4  |
| 6,  | 5,  | -2, | -7, | -6, | 3,  | 8,  | 7   |
| 1,  | 2,  | -3, | -4, | -5, | 4,  | -1, | 0   |
| -6, | 3,  | 8,  | 7,  | 6,  | 5,  | -2, | -7  |
| -5, | 4,  | -1, | 0,  | 1,  | 2,  | -3, | -4  |
| 6,  | 5,  | -2, | -7, | -6, | 3,  | 8,  | 7   |

FIG.21

150Lpi VERTIAL LINES (4 × 4)
A = 0 THROUGH 8

| 1, | -1, | 0,  | 5 |
|----|-----|-----|---|
| 2, | -7, | -5, | 6 |
| 3, | -6, | -4, | 7 |
| 4, | -3, | -2, | 8 |

FIG.22

150Lpi VERTICAL LINES (4 × 8)
A = 0 THROUGH 8

| -16, | -8, | 0, | 8 |
|---|---|---|---|
| -15, | -7, | 1, | 9 |
| -14, | -6, | 2, | 10 |
| -13, | -5, | 3, | 11 |
| -12, | -4, | 4, | 12 |
| -11, | -3, | 5, | 13 |
| -10, | -2, | 6, | 14 |
| -9, | -1, | 7, | 15 |

FIG.23

141Lpi 45 DEGREES (6 × 6)
A = 0 THROUGH 8

| -9, -2, 7, | 8, 3, -6 | -9, -2, 7, | 8, 3, -6 |
|---|---|---|---|
| -4, -3, 6, | 1, 0, -5 | -4, -3, 6, | 1, 0, -5 |
| 5, 2, -7, -8, -1, | 4 | 5, 2, -7, -8, -1, | 4 |
| 8, 3, -6, -9, -2, | 7 | 8, 3, -6, -9, -2, | 7 |
| 1, 0, -5, -4, -3, | 6 | 1, 0, -5, -4, -3, | 6 |
| -8, -1, | 4, 5, 2, -7 | -8, -1, | 4, 5, 2, -7 |
| -9, -2, 7, | 8, 3, -6 | -9, -2, 7, | 8, 3, -6 |
| -4, -3, 6, | 1, 0, -5 | -4, -3, 6, | 1, 0, -5 |
| 5, 2, -7, -8, -1, | 4 | 5, 2, -7, -8, -1, | 4 |
| 8, 3, -6, -9, -2, | 7 | 8, 3, -6, -9, -2, | 7 |
| 1, 0, -5, -4, -3, | 6 | 1, 0, -5, -4, -3, | 6 |
| -8, -1, | 4, 5, 2, -7 | -8, -1, | 4, 5, 2, -7 |

FIG.25A

| -1 | 0  | 1  | 2 |
|----|----|----|---|
| -2 | -7 | -6 | 3 |
| -3 | -4 | -5 | 4 |
| 8  | 7  | 6  | 5 |

FIG.25B

| 2 | -1 |
|---|----|
| 1 | 0  |

FIG.25C

| 0 |
|---|

FIG.27A

| 2 | 3 | 4 | 5 |
|---|---|---|---|
| 1 | −6 | −5 | 6 |
| 0 | −7 | −4 | 7 |
| −1 | −2 | −3 | 8 |

FIG.27B

| 5 | 4 | 3 | 2 |
|---|---|---|---|
| 6 | −5 | −6 | 1 |
| 7 | −4 | −7 | 0 |
| 8 | −3 | −2 | −1 |

FIG.28

| 10 | 11 | 12 | 13 |
|---|---|---|---|
| 9 | 2 | 3 | 14 |
| 8 | 1 | 4 | 15 |
| 7 | 6 | 5 | 16 |

FIG.29

| 144 | 152 | 160 | 168 |
|---|---|---|---|
| 136 | 80 | 88 | 176 |
| 128 | 72 | 96 | 184 |
| 120 | 112 | 104 | 192 |

LIGHT-SHADE PORTION

MEDIUM-SHADE PORTION

DARK-SHADE PORTION

FIG.35

| 13 | 12 | 11 | 10 |
|----|----|----|----|
| 14 | 3  | 2  | 9  |
| 15 | 4  | 1  | 8  |
| 16 | 5  | 6  | 7  |

FIG.36

| 168 | 160 | 152 | 144 |
|-----|-----|-----|-----|
| 176 | 88  | 80  | 136 |
| 184 | 96  | 72  | 128 |
| 192 | 104 | 112 | 120 |

FIG.37

| 4  | 5 | 0  | -7 | -4 | 7 | 2  | 3  |
|----|---|----|----|----|---|----|----|
| -5 | 6 | -1 | -2 | -3 | 8 | 1  | -6 |
| -4 | 7 | 2  | 3  | 4  | 5 | 0  | -7 |
| -3 | 8 | 1  | -6 | -5 | 6 | -1 | -2 |
| 4  | 5 | 0  | -7 | -4 | 7 | 2  | 3  |
| -5 | 6 | -1 | -2 | -3 | 8 | 1  | -6 |
| -4 | 7 | 2  | 3  | 4  | 5 | 0  | -7 |
| -3 | 8 | 1  | -6 | -5 | 6 | -1 | -2 |

LIGHT-SHADE PORTION

MEDIUM-SHADE PORTION

DARK-SHADE PORTION

FIG.41
| 2 | 6 | 3 | 8 |
|---|---|---|---|
| 1 | -6 | -5 | 5 |
| 0 | -7 | -4 | 7 |
| -1 | -2 | -3 | 4 |
FIG.42
| 144 | 176 | 152 | 192 |
|---|---|---|---|
| 136 | 80 | 88 | 168 |
| 128 | 72 | 96 | 184 |
| 120 | 112 | 104 | 160 |

LIGHT-SHADE PORTION

MEDIUM-SHADE PORTION

DARK-SHADE PORTION

FIG.44

| 3 | −1 | 6 | 2 |
|---|---|---|---|
| 8 | −6 | −5 | −2 |
| −3 | −7 | −4 | 7 |
| 1 | 5 | 0 | 4 |

FIG.45

| 11 | 7 | 14 | 10 |
|---|---|---|---|
| 16 | 2 | 3 | 6 |
| 5 | 1 | 4 | 15 |
| 9 | 13 | 8 | 12 |

# IMAGE PROCESSING METHOD, IMAGE PROCESSING APPARATUS AND RECORDING MEDIUM

CROSS REFERENCE TO RELATED APPLICATIONS

This application is a divisional application of application Ser. No. 09/695,992, filed Oct. 26, 2000, now U.S. Pat. No. 6,977,757, which claims priority to Japanese Application Nos. 11-309413, filed Oct. 29, 1999; 2000-106451, filed Apr. 7, 2000; and 2000-106452, filed Apr. 7, 2000, the entire contents of which are incorporated herein by reference.

BACKGROUND OF THE INVENTION

1. Field of the Invention

The present invention generally relates to an image processing method, an image processing apparatus and a recording medium, and in particular, to an image processing method, an image processing apparatus and a recording medium employing an error diffusion method for quantizing multi-tone image data.

2. Description of the Related Art

In many cases, a dither method or an error diffusion method is employed in quantization of multi-tone image data for falsely reproducing tones of a multi-tone image in a laser printer, a digital copier, a display device, and other various image processing apparatus, for example.

Generally, the dithering method has advantages such that graininess is superior and it is possible to represent a halftone image smoothly. However, by such an area halftoning method, typically, the dithering method, resolution is degraded for achieving halftoning. Further, by the ditheritg method by which a cyclic image is generated, a moiré pattern is likely to be generated when a printed image such as that consisting of halftone spots is processed.

On the other hand, when the error diffusion method is used, it is possible to obtain resolution close to an original image, and the method is suitable for reproducing a character/letter image.

However, in the error diffusion method, when a halftone image such as a photograph is processed, isolated dots are dispersed, or dots are arranged continuously irregularly, and, thereby, graininess is not satisfactory. Further, peculiar textures may be generated, as is well known.

Further, in an electrophotographic printer, a printed image is likely to be not stable because the image is formed of isolated dots. In particular, when the error diffusion method is used in such a printer, a rate of occurrences of small isolated dots increases, thereby, the instability further increases, and degradation of graininess due to shade unevenness and banding (band-like shade unevenness) are likely to occur. With regard to the error diffusion method, in order to eliminate generation of textures due to irregular continuation of dots, the following modification arts, such as that in which a dither threshold is used as a quantization threshold so as to disturb continuation of dots, for example, have been proposed:

(1) An amount of error diffusion is increased as an edge amount increases for the purpose of eliminating generation of pseudo-contours and special stripe patterns (Japanese Laid-Open Patent Application No. 3-34772);

(2) For the purpose of preventing generation of a white blank at a non-edge, light-shade portion and preventing generation of notches in characters, a fixed threshold is used for an edge portion of an image, while a variable threshold is used for a non-edge portion, and the level of the variable threshold is lower as the shade is lighter (Japanese Patent No. 2755307); and (3) For the purpose of preventing generation of moiré patterns and pseudo-contours when a multi-level printer of more than two levels is used, a dither signal having a magnitude according to an edge amount is added to image data for an edge portion of an image, while a fixed value is added to image data for a non-edge portion, and, the image data thus obtained is quantized into multilevel digital data using a fixed threshold (Japanese Patent No. 2801195).

SUMMARY OF THE INVENTION

An object of the present invention is to provide an improved image processing method and an improved image processing apparatus, for producing high quality images, in which, as a result of compensating defects of the error diffusion method, changing points of characters and other images are represented with high resolution, while portions of photographs and images where change is a little are represented smoothly and stably, and the portions of both types match one another without incompatibility.

Another object of the present invention is to provide an image processing method and an image processing apparatus by which halftone-spot images can be reproduced with high image quality.

Further, in a configuration as in the proposal of Japanese Patent No. 2801195 in which a dither signal is added to image data as described above, image data overflows as a result of the dither signal being added when the image data has a saturated level or an approximately saturated level. If image data is reduced in order to avoid such a situation, the shade is saturated. In order to solve the problems, it is necessary to widen the operation range of image data in expectation of addition of the dither signal.

In view of this matter, another object of the present invention is to provide an image processing method and an image processing apparatus by which, it is not necessary to widen the operation range of image data, but high quality images can be produced.

Other objects of the present invention will now be listed:

High grade images having cyclicity which is not remarkable to the sense of sight of human being, having little deformation of halftone spots and having satisfactory graininess can be produced;

High grade, smooth images having superior stability in light shade portions can be produced;

High grade, smooth images having cyclicity agreeable to human being can be produced;

High grade images having little deformation of halftone spots and having satisfactory graininess can be produced;

High grade, smooth images having superior stability in particular in image flat portions can be produced;

High grade images having high resolution in relatively coarse halftone-spot image portions, character portions or the like and smooth and stable in relatively fine halftone-spots image portions, photograph portions or the like can be produced; and A high grade, balanced image can be produced from image data having various characteristics.

According to the present invention, in an image processing apparatus and method of quantizing multi-tone image data by an error diffusion method, in order to generate output dots of an image concentratedly and cyclically for a portion in which change of the image data is small so as to improve stability and graininess of the image, change of the image data is detected, and a threshold for quantization is cyclically oscillated in the image space in an oscillation range controlled according to the detection result of the detection of change of the image data.

Further, according to the present invention, in order to achieve both resolution of an edge portion of an image and stability and graininess of a flat portion of the image, an edge degree of the image data is detected, and the oscillation range of the quantization threshold is controlled in multi-levels according to the edge degree.

Further, according to the present invention, in order to improve reproducibility of a halftone-spot image portion and to prevent moire patterns from being generated, cyclicity of change of the image data is detected, and, according to the detection result, the oscillation range of the quantization threshold is controlled.

Further, according to the present invention, in order to achieve both resolution of an edge portion of an image and stability and graininess of a flat portion of the image, and, also, to prevent moiré patterns from being generated, an edge degree of the image data is detected, region expansion processing is performed on the edge degree, and the oscillation range of the quantization threshold is controlled in multi-levels according to the edge degree having undergone the region expansion processing. Further, in order to achieve high resolution and prevent moiré patterns from being generated for a halftone-spot image having an image space frequency (halftone-spot occurrence cycles per inch) employed in general printing, the expansion extent of the region expansion processing is selected to be within 0.5 mm in the image space.

Further, according to the present invention, in order to form a stable, high-quality image in an electrophotographic printer or the like in which discrete separate dots are used for forming images, by causing a flat portion of an image to oscillate cyclically in a wide oscillation range, the quantization threshold is oscillated approximately around the central value of the data range of the image data, and the maximum oscillation range is set to be equal to or larger than ⅓ the data range, and the image data is quantized into two levels.

Further, according to the present invention, in order to simplify the configuration relating to generation of the quantization thresholds, a plurality of fluctuating values oscillating in respective different oscillation ranges cyclically in the image space are generated, and, one thereof is selected according to the edge degree, and, thus, the quantization threshold being generated.

According to the present invention described above, the following advantages can be obtained.

(1) By detecting change of multi-tone image data and oscillating the quantization threshold of the error diffusion processing in the oscillation range according to the detection result, it is possible to obtain high resolution by performing processing mainly based on error diffusion for characters or image changing points, and to obtain improved graininess and stability of image and to reduce shade unevenness and banding by performing processing mainly based on dithering for photographs or portions in which change of image is a little.

(2) By controlling the oscillation range of the quantization threshold according to the edge degree, it is possible to achieve both resolution of image edge portions and stability and graininess of image flat portions, and, also, to express transition regions between both the image portions smoothly and to make the both to match one another without incongruousness.

(3) By detecting the cyclicity of change of the image data and controlling the oscillation range of the quantization threshold according to the detection result, a fine halftone-spot image is evaluated as an edge portion, and, therefor, processing mainly according to the error diffusion technique using a fixed quantization threshold or a oscillating quantization threshold in a small oscillation range is performed. Thereby, it is possible to reproduce halftone spots faithfully with high resolution, and to prevent moiré patterns from being generated.

For halftone-spot images of a low halftone-spot occurrence cycles per inch (image space frequency) for which it is difficult to perform smoothing processing with resolution left un-degraded, halftone-spot peripheral portions evaluated as edges are processed mainly according to the error diffusion technique using fixed quantization thresholds or oscillating quantization thresholds in small oscillation ranges. Accordingly, the halftone spots are reproduced faithfully, and also, moiré patterns are prevented from being generated. Further, halftone-spot central portions not evaluated as edges are processed mainly according to the dithering technique using oscillating quantization thresholds in large oscillation ranges. Accordingly, it is possible to express these portions with satisfactory stability and graininess.

(4) By detecting the edge degree of the image data, and, controlling the oscillation range of the quantization threshold according to the edge degree having undergone the reign expansion processing, a relatively fine halftone-spot image, a character or a line drawing, is evaluated as an edge portion, and, therefor, processing mainly according to the error diffusion technique using a fixed quantization threshold or a oscillating quantization threshold in a small oscillation range is performed. Thereby, it is possible to reproduce halftone spots faithfully with high resolution, and to prevent moiré patterns from being generated.

Halftone-dot components of high halftone-spot occurrence cycles per inch equal to or higher than 175 Lpi are not left in the smoothed image data. Accordingly, for halftone-spot images of such high halftone-spot occurrence cycles per inch such as photograph in which image change is a little, they are processed mainly according to the dithering technique using oscillating quantization threshold in a large oscillation range same as for image flat portions. Thereby, they are converted into halftone spots at the dither threshold cycles. Accordingly, it is possible to form images superior in graininess and stability, and, also, to reduce banding and shade unevenness. Further, because halftone-spot components are removed from the image data, no moiré patterns are generated.

Further, by controlling the oscillation range of quantization threshold in multi-levels, it is possible to express transition regions between both the image portions (character, line drawing or a coarse halftone-spot image region and a photograph, a flat portion or a fine halftone-spot image region) smoothly and to make the both to match one another without incongruousness.

(5) By selecting the expansion extent of the region expansion processing to be within 0.5 mm, a relatively fine halftone-spot image frequently used in general printing is processed mainly based on error diffusion, thereby, the halftone spots are reproduced with high resolution, and, thereby, moiré patterns can be prevented from being generated.

(6) By selecting the maximum oscillation range of the quantization threshold to be equal to or larger than ⅓ the image data range, it is possible to reproduce an image flat portion with stable, high image quality when an electrophotographic printer or the like is used.

(7) By oscillating the quantization threshold, it is possible to avoid overflow of image data, saturation of shade, and eliminate necessity of expansion of the operation range of image data needed in a configuration in which a dither signal is added to image data.

(8) By generating a plurality of fluctuating values oscillating cyclically in respective different oscillation ranges in the image space, selecting one thereof according to the edge degree, and thus generating the quantization threshold, it is possible to omit processing of adding a fixed value, and multiplication processing disadvantageous in view of costs and processing time in general. Accordingly, it is further easier to achieve the configuration by hardware.

(9) It is possible to achieve image processing apparatuses such as a printer, a display, a scanner, a facsimile machine, a digital copier and so forth, by which it is possible to reproduce with high image quality images containing characters, line drawings, photographs, halftone spots and so forth mixed therein.

According to another aspect of the present invention, an image processing apparatus includes a quantization threshold generating part generating the quantization threshold oscillating cyclically, and an error diffusion processing part using the thus-generated quantization threshold, quantizing input multi-tone image data by an error diffusion method and outputting quantized data.

Further, in order to form images having cyclicity not likely to be remarkable to human eyes, having a little deformation of halftone spots, and also, superior in graininess, the quantization threshold generating part uses a dither threshold matrix for forming halftone spots having a space image frequency in the range of 100 through 250 Lpi for generating the quantization thresholds.

Thereby, images having cyclicity not likely to be remarkable to human eyes are formed through concentration of dots performed in the range of resolution of an electrophotographic printer or the like. Accordingly, it is possible to form high-grade images superior in graininess and having a little deformation of halftone spots.

In order to form high-grade images having directionality not likely to be remarkable to human eyes, the quantization threshold generating part uses a dot-concentration dither threshold matrix having a screen angle of around 45° for generating the quantization thresholds.

Thereby, high-grade images having directionality not likely to be remarkable to human eyes can be formed, and, also, change of image impression is not remarkable even 90° rotation processing is performed.

In order to form smooth, high-grade images superior in stability for low-shade portions, the quantization threshold generating part uses a dither threshold matrix obtained from combining a plurality of basic dither threshold matrixes, wherein adjacent basic dither threshold matrixes are relatively shifted by a half phase in a direction perpendicular to the adjacent direction.

Thereby, halftone-spot development starting points are arranged staggeringly, and, for low-shade portions, stable, smooth, high-grade images can be formed.

In order to form smooth, high-grade images having cyclicity conformable to human eye sight, the quantization threshold generating part uses a dither threshold matrix obtained from combining a plurality of basic dither threshold matrixes each having a size of four pixels in each of main and sub-scanning directions, wherein adjacent basic dither threshold matrixes are relatively shifted by a half phase in a direction perpendicular to the adjacent direction.

Thereby, halftone spots of 150 Lpi are formed in image formation of 600 dpi, and it is possible to form images having cyclicity comfortable for human eye sight.

In order to form high-grade images having superior graininess and a little deformation of halftone spots, the quantization threshold generating part uses a dither threshold matrix obtained from combining a plurality of basic dither threshold matrixes, wherein adjacent basic dither threshold matrixes are relatively shifted by a half phase in a direction perpendicular to the adjacent direction, and having a cycle of halftone-spot development starting points of eight pixels in a main scanning direction and four pixels in a sub-scanning direction.

Thereby, intervals of on/off of halftone spots in the main scanning direction are long, and, therefore, it is possible to form images having a little deformation of halftone spots and having superior graininess.

In order to form smooth, high-grade images superior in stability for image flat portions, the quantization threshold generating part uses a dither threshold matrix for forming lines extending in a sub-scanning direction for forming the quantization thresholds.

Thereby, it is possible to form smooth and high-grade images superior in stability especially for image flat portions, by lines extending in the sub-scanning direction made of dots arranged continuously in the sub-scanning direction.

In order to form images with high resolution for characters or image changing points, and smooth and stable for photographs or portions having a little image change, and in which both the regions match one another without incongruousness, an edge detecting part detecting an edge level of input image data is further provided, and the quantization threshold generating part controls the oscillation range of the quantization threshold according to the thus-detected edge level.

Thereby, it is possible to form images with high resolution for characters or image changing points and smooth and stable for photographs or portions having a little image change, and in which both the regions match one another without incongruousness.

In order to form images with high resolution for characters or relatively coarse halftone-spot image portions and smooth and stable for photographs or fine halftone-spot image portions, and in which both the regions match one another without incongruousness, an edge detecting part detecting an edge level of input image data and a region expansion processing part performing region expansion processing on the edge data are further provided, and the quantization threshold generating part controls the oscillation range of the quantization threshold according to the edge level having undergone the region expansion processing.

Thereby, halftone-spot images can be reproduced with high resolution.

Further, in order to form well-balanced, high-grade images for image data having various characteristics, the quantization threshold generating part controls the oscillation range of the quantization threshold according to the edge level (detected by the edge detecting part or further having undergone the region expansion processing), and, also, switch the dither threshold matrix used for generating the quantization thresholds according to an externally specified mode.

Thereby, it is possible to form high-grade, well-balanced images suited for characteristics of original images.

According to another aspect of the present invention, multi-tone image data is quantized by quantization processing by an error diffusion method, dots are output according to the quantized data, and images are formed, wherein the quantization threshold for the quantization processing is caused to oscillate cyclically.

Specifically, in order to make dots be easy to be concentrated, and, also, avoid continuation of dots of adjacent cycles in low or medium-shade portions, and to achieve stable image formation, the oscillation of the quantization threshold is controlled so that output dots develop spirally outward in a specific cycle of the image space as the shade level of the multi-tone image data increases.

In order to make dots be easy to be concentrated in a neat shape by developing output dots in a direction determined in consideration of a direction of propagation of quantization errors, the oscillation of the quantization threshold is controlled so that the output dots develop clockwise when the error diffusion processing is performed from the top left to the bottom right in the image space, and counterclockwise when the error diffusion processing is performed from the top right to the bottom left in the image space.

In order to avoid blank occurrences in high-shade portions, the oscillation of the quantization threshold is controlled so that output dots develop dispersedly for high-shade portions of multi-tone image data.

In order to achieve formation of smooth, high-grade images not likely to be adversely affected by shade change by controlling shift of the central positions of halftone spots through from low-shade portion to high-shade portion, the oscillation of the quantization threshold is controlled so that the output dots develop concentratedly in the central portion of a specific cycle of the image space for low-shade portions of multi-tone image data, and output dots radially develop dispersedly in the peripheral portion of the specific cycle of the image space for medium or high-shade portions of multi-tone image data.

In order to achieve dot development in the sub-scanning direction with priority (vertical-based dot development) not likely to be adversely affected by noise such as banding in electrophotographic printer or the like for low-shade portions, the oscillation of the quantization threshold is controlled so that output dots develop in the sub-scanning direction with priority for a low shade level region of the multi-tone image data.

An image processing apparatus according to another aspect of the present invention comprises a quantization threshold generating part generating a cyclically oscillating quantization threshold; and an error diffusion processing part quantizing input multi-tone image data using the quantization threshold generated by the quantization threshold generating part by an error diffusion method, and outputting quantized data.

In order to make dots be easy to be concentrated, and, also, avoid continuation of dots of adjacent cycles in low or medium-shade portions, and to achieve stable image formation, the quantization threshold generating part generates the quantization threshold using a dither threshold matrix in which thresholds are arranged spirally outward in the ascending order.

Thereby, it is possible to form stable images.

In order to make dots be easy to be concentrated in a neat shape by developing output dots in a direction determined in consideration of a direction of propagation of quantization errors, the dither threshold matrix is such that the threshold sequentially increases clockwise or counterclockwise selected according to the direction of the error diffusion processing.

Thereby, it is possible to form images superior in stability and graininess for low and medium-shade portions.

In order to avoid blank occurrences in high-shade portions, the dither threshold matrix is such that the thresholds are arranged dispersedly in the ascending order in the peripheral portion thereof.

Thereby, blank occurrences in high-shade portions can be reduced, and, also, dot concentration is made to be easy to be performed for low and medium-shade portion. Accordingly, it is possible to form images in which blank occurrences are not remarkable and also superior in stability, smooth and of high grade.

In order to achieve formation of smooth, high-grade images not likely to be adversely affected by shade change by controlling shift of the central positions of halftone spots through from low-shade portion to high-shade portion, the quantization threshold generating part generates the quantization threshold using a dither threshold matrix in which small thresholds are arranged concentratedly in the central portion and thresholds larger than them are dispersedly arranged radially in the ascending order.

In order to achieve dot development in the sub-scanning direction with priority (vertical based) not likely to be adversely affected by noise such as banding in electrophotographic printer or the like for low-shade portions, the thresholds are arranged in the ascending order so as to be arranged in the sub-scanning direction with priority in the central portion of the dither threshold matrix.

Thereby, it is possible to form high-grade images superior in stability for low-shade portions.

In order to achieve formation of images superior in stability for image portions such as photograph in which image data change is a little, and with high resolution for image portions such as character in which image data change is large, and in which both regions match one another without incongruousness, an edge detecting part detecting an edge level of the multi-tone image data is further provided, and, the quantization threshold generating part controls an oscillation range of the quantization threshold according to the edge level detected by the edge detecting part.

Thereby, it is possible to form high-grade images.

In order to achieve formation of high-grade images superior in stability for image portions such as not only photograph but also fine halftone-spot images, and with high resolution for image portions such as not only character but also relatively coarse halftone-spot images, and in which both regions match one another without incongruousness, an edge detecting part detecting an edge level of the multi-tone image data and a region expansion processing part are further provided, and, the quantization threshold generating part controls an oscillation range of the quantization threshold according to the edge level having undergone the region expansion processing performed by the region expansion processing part.

Thereby, it is possible to form high-grade images.

Other objects and further features of the present invention will become more apparent from the following detailed description when read in conjunction with the accompanying drawings.

BRIEF DESCRIPTION OF THE DRAWINGS

Figures 2A, 2B, 2C, 2D:
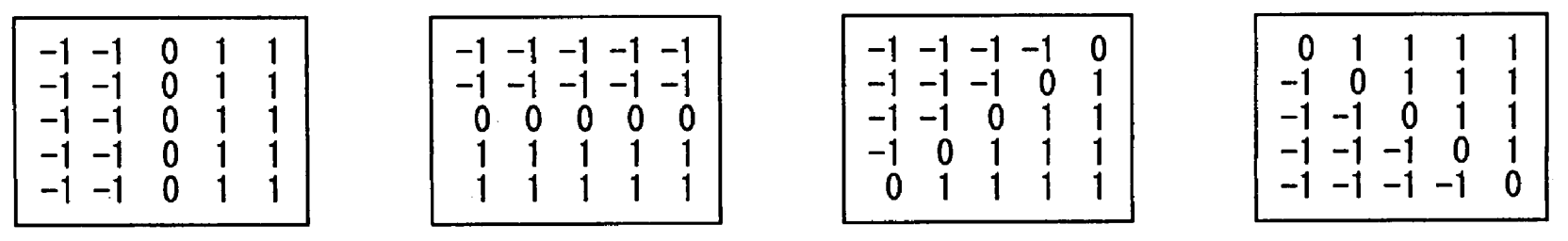

FIGS. 2A, 2B, 2C and 2D show differential filters for edge detection according to the present invention;

FIGS. 6, 7, 8 and 9 show examples of dither threshold generating dither threshold tables for quantization threshold generation for edge levels 0, 1, 2 and 3, respectively, used in the quantization threshold generating part shown in FIG. 5;

FIG. 17 shows one example of an error diffusion matrix according to the present invention;

FIG. 18 show differential filters for edge detection according to the present invention;

FIGS. 19, 20, 21, 22 and 23 shows other examples of dither threshold tables (dither threshold matrixes) for quantization threshold generation according to the present invention;

FIGS. 25A, 25B and 25C show other examples of dither threshold matrixes corresponding to specified modes (FIG. 25A: photograph mode; FIG. 25B: character/photograph mode; and FIG. 25C: character mode) according to the present invention;

FIGS. 27A and 27B show other examples of dither threshold matrixes for quantization threshold generation according to the present invention;

FIG. 28 shows an order of output dot generation for image flat portions, when the dither threshold matrix shown in FIG. 27A is used, according to the present invention;

FIG. 29 shows a quantization thresholds generated for image flat portions, when the dither threshold matrix shown in FIG. 27A is used, according to the present invention;

FIG. 35 shows an order of output dot generation for image flat portions in the case of the direction shown in FIG. 34, when the dither threshold matrix shown in FIG. 27B is used, according to the present invention;

FIG. 36 shows a quantization thresholds generated for image flat portions in the case of the direction shown in FIG. 34, when the dither threshold matrix shown in FIG. 27B is used, according to the present invention;

FIG. 37 shows another example of a dither threshold matrix for quantization threshold generation according to the present invention;

FIG. 41 shows another example of a dither threshold matrix for quantization threshold generation according to the present invention;

FIG. 42 shows quantization thresholds generated for an image flat portion when the dither threshold matrix shown in FIG. 41 is used;

FIG. 44 shows another example of a dither threshold matrix for quantization threshold generation according to the present-invention;

FIG. 45 shows quantization thresholds generated for an image flat portion when the dither threshold matrix shown in FIG. 44 is used.

DETAILED DESCRIPTION OF THE PREFERRED EMBODIMENTS

Figure 1:
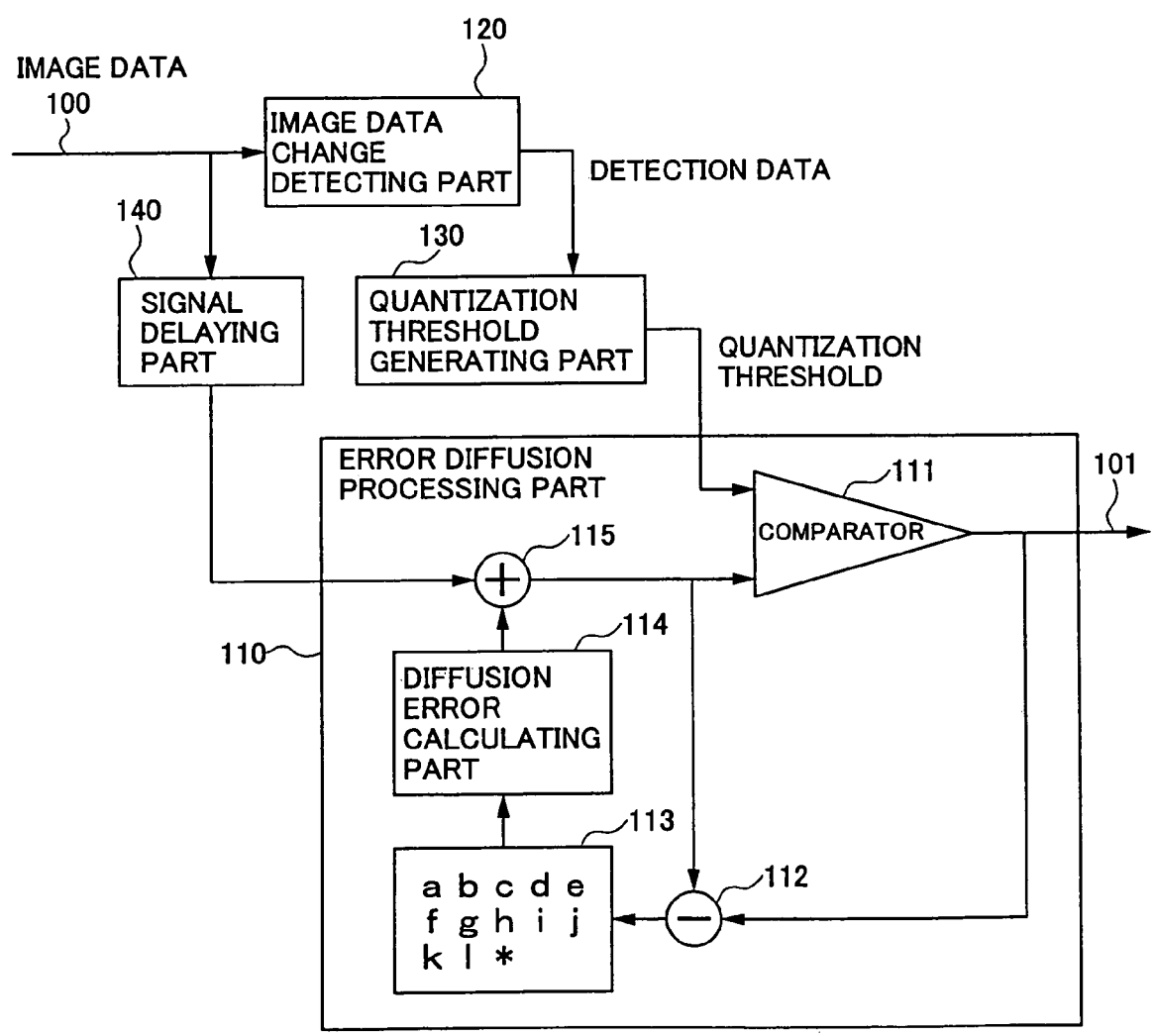
FIG. 1 shows a block diagram of one example an image processing apparatus according to the present invention.

With reference to the accompanying drawings, preferred embodiments of the present invention will now be described. For the sake of avoiding duplicated description, the same reference numerals are given to the same parts/components or corresponding parts/components in a plurality of drawings of the accompanying drawings.

A first embodiment of the present invention will now be described.

FIG. 1 shows a block diagram of an image processing apparatus in the first embodiment of the present invention.

The image processing apparatus quantizes multi-tone image data 100 and outputs 2-bit image data 101.

The image processing apparatus includes an error diffusion processing part 110, an image data change detecting part 120, a quantization threshold generating part 130, a signal delaying part 140 for timing adjustment between the error diffusion processing part 110 and the other parts. The signal delaying part 140 is provided as the necessity arises, and includes a predetermined number (line number) of line memories, for example.

In this embodiment, it is assumed that the image data 100 is 8-bit data.

The error diffusion processing part 110 uses a quantization threshold generated by the quantization threshold generating part 130, and quantizes input image data into two-level data.

As shown in FIG. 1, the error diffusion processing part 110 includes a comparator (quantizer) 111, an error calculating part 112, an error storing part 113, a diffusion error calculating part 114, and an error adding part 115.

Multi-tone image data input via the signal delaying part 140 is input to the comparator after having diffusion error data added thereto by the error adding part 115.

The comparator 111 outputs "1" when input image data is equal to or larger than the quantization threshold, and outputs "0" in the other cases, as image data 101.

The error calculating part 112 calculates an error between the image data input to the comparator 111 and the image data 101 output from the comparator 111.

Because the image data processed here is 8-bit image data, "1" of the output image data 101 is processed as 255 (decimal notation) and "0" as 0 (decimal) in the error calculation.

The calculated error is written to the error storing part 113. The error storing part 113 is used for storing error data concerning already processed pixels surrounding a target pixel. Because diffusion is made up to the pixel two lines ahead of the target pixel in this embodiment, three line memories for three lines, for example, are used as the error storing part 113.

The diffusion error calculating part 115 calculates an error amount to be diffused to a subsequent target pixel from the error data stored in the error storing part 113. In this embodiment, as shown in the inside of the block of the error storing part 113, the diffusion error calculating part 115 has coefficients (the total of which is 32) corresponding to 12 pixel positions a, b, c, . . . , k and l surrounding a pixel position * of a pixel processed immediately precedingly, and provides a value obtained as a result of dividing by 32 the total of values obtained by multiplying the error data corresponding to those 12 pixel positions by the corresponding coefficients, respectively, as the error diffusion amount for the subsequent target pixel, to the error adding part 115. The method of calculating the diffusion error amount may be appropriately changed.

The image data change detecting part 120 detects change of the image data 100, and detection data thereof is used by the quantization threshold generating part 130 for controlling an oscillation range of the quantization threshold.

In this embodiment, the image data change detecting part 120 detects an edge degree of the image data 100, and outputs the detected edge degree as 4-bit detection data which may vary from a level 0 (non edge) to a level 8 (maximum edge degree).

Further specifically, 4 types of differential filters shown in FIGS. 2A, 2B, 2C and 2D are used, respective edge amounts for four directions, i.e., a main scanning direction, a sub-scanning direction, and directions ±45° oblique from the main scanning direction, are detected, the one, the absolute value of which is the largest, is selected from the detected four edge amounts, and the absolute value of the selected edge amount is encoded into detection data representing the edge degree which may vary 9 levels from the level 0 to the level 8. The method of detecting the edge degree may be appropriately changed.

A method of detecting the edge amount by using the differential filters shown in FIGS. 2A through 2D is to obtain the total of values obtained from multiplying image data of pixels surrounding a target pixel at pixel positions shown in each of the filters shown in FIGS. 2A through 2D by the corresponding coefficients shown in the figures, respectively, for example.

The quantization threshold generating part 130 generates the quantization threshold which oscillates cyclically in image space with the oscillation range controlled according to the detection data from the image data change detecting part 120, and provides the quantization threshold to the comparator 111 of the error diffusion processing part 110.

Figures 3, 4:
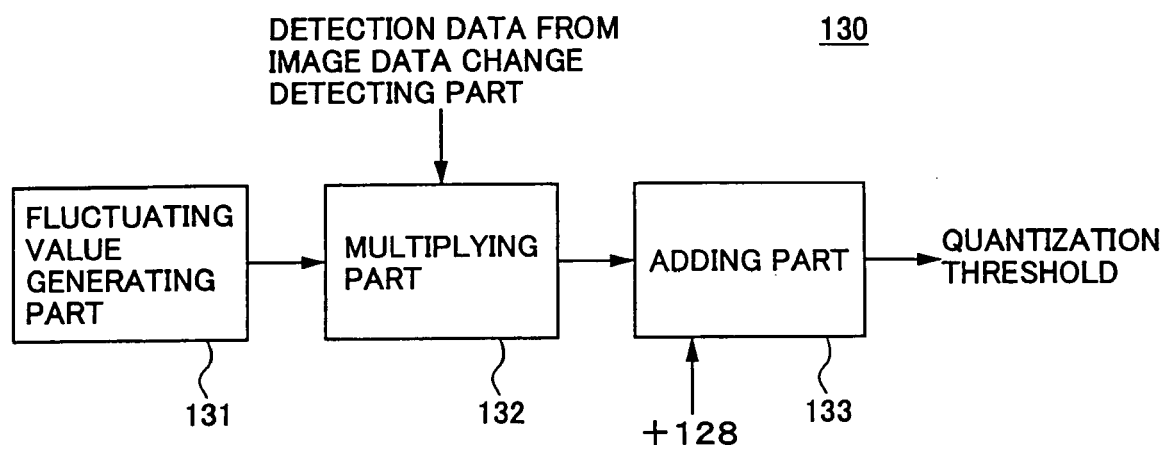
FIG. 3 shows a block diagram of one example of a quantization threshold generating part according to the present invention.
FIG. 4 shows one example of a dither threshold table for quantization threshold generation according to the present invention.

In the present embodiment, the quantization threshold generating part 130 includes, as shown in FIG. 3, a fluctuating value generating part 131 generating a fluctuating value oscillating cyclically in image space, a multiplying part 132 multiplying the fluctuating value by a multiplication factor according to the edge degree provided, and an adding part 133 adding a fixed value to the fluctuating value obtained as a result of being multiplied by the multiplying part 132.

The fluctuating value generating part 131 uses a 4×4 dither threshold table such as that shown in FIG. 4, in which the coefficient thereof increases from −7 to +8 spirally from the center thereof, for example. This table is applied to each set of pixels of an original image so as to cover the entire area of the original image. Then, the above-mentioned coefficients of the dither threshold table are read out according to target-pixel positions. Thereby, the fluctuating value generating part 131 generates the fluctuating value which oscillates between −7 and +8 cyclically in the image space.

This fluctuating value generating part 131 can be easily achieved by using a ROM storing the dither threshold table, counters counting timing pulses in the main and sub-scanning of the image data so as to generate reading addresses for the ROM, and so forth.

The multiplying part 132 multiplies the fluctuating value by the multiplication factor 8 when the edge degree represented by the detection data from the image data change detecting part 120 is the level 0 (non edge), the multiplication factor 7 when the edge degree is the level 1, the multiplication factor 6 when the edge degree is the level 2, the multiplication factor 5 when the edge degree is the level 3, the multiplication factor 4 when the edge degree is the level 4, the multiplication factor 3 when the edge degree is the level 5, the multiplication factor 2 when the edge degree is the level 6, the multiplication factor 1 when the edge degree is the level 7 and the multiplication factor 0 when the edge degree is the level 8 (maximum edge degree).

Accordingly, the output value of the multiplying part 132 oscillates with the maximum oscillation range between +64 and −56 when the edge degree is the level 0. The fixed value added by the adding part 133 is selected to be +128 (decimal) which is the medium value of the range of the image data.

Thereby, the quantization threshold provided to the comparator 111 oscillates around the oscillation center of 128, and the maximum oscillation range thereof is 120 (between +192 and −72) when the edge degree is the level 0.

By the above-described configuration, for a portion in an image in which change of image data is sharp (where the edge degree is high level) such as an edge portion of a character or a line drawing, for example, the edge degree thereof is the maximum level 8, the quantization threshold is fixed to +128. Thereby, a true or pure error diffusion method is used for quantization using the fixed threshold in the error diffusion processing part 110.

As the level of the edge degree decreases, the oscillation range of the oscillation component added to the quantization threshold increases. Thereby, the processing performed by the error diffusion processing part 110 changes from the processing mainly according to error diffusion into the processing mainly according to dithering.

Then, when the oscillation range of the quantization threshold becomes maximum for a flat portion of an image where the edge degree is the level 0.

Thus, for a portion of an image in which change in image data is large such as a character or a line drawing, high resolution processing mainly by error diffusion technique is performed. In contrast to this, for a flat portion or a photograph, high graininess, stable processing mainly by dithering technique in which dots are concentrated is performed.

Further, in a boundary between portions of both types, the oscillation range of the quantization threshold changes gradually according to the edge degree. Thereby, the characteristics of the processing are smoothly switched from the processing mainly according to the error diffusion technique to the processing mainly according to the dithering technique, and vise versa.

Accordingly, when the output image data 101 of the error diffusion processing part 110 is provided to an image forming apparatus such as an electrophotographic printer or the like, it is possible to form a high quality image having high resolution at a portion in which change in image data is sharp such as a character or a line drawing, being smooth and stable at a portion in which change in image data is gentle such as a photograph, and, also, having no incongruity at a boundary between portions of both types.

In particular, in order to obtain a high quality in a printed image by an electrophotographic printer for an image flat portion, it is effective to oscillate image data in an oscillation range sufficiently larger in ratio to the range of image data at a low frequency. From this point of view, it is generally preferable to select a value equal to or larger than ⅓ the range of image data as the maximum oscillation range of the quantization threshold (in the case where the edge degree is the level 0), and the present embodiment satisfies this condition.

Because the quantization threshold is caused to oscillate in the oscillation range according to the edge degree, the method in the present invention is different from that disclosed in Japanese Patent No. 2801195 described above in which a dither signal is added to image data, there occurs no problem in that widening of the-operation range of image data is needed and so forth.

A second embodiment of the present invention will now be described.

Figure 5:
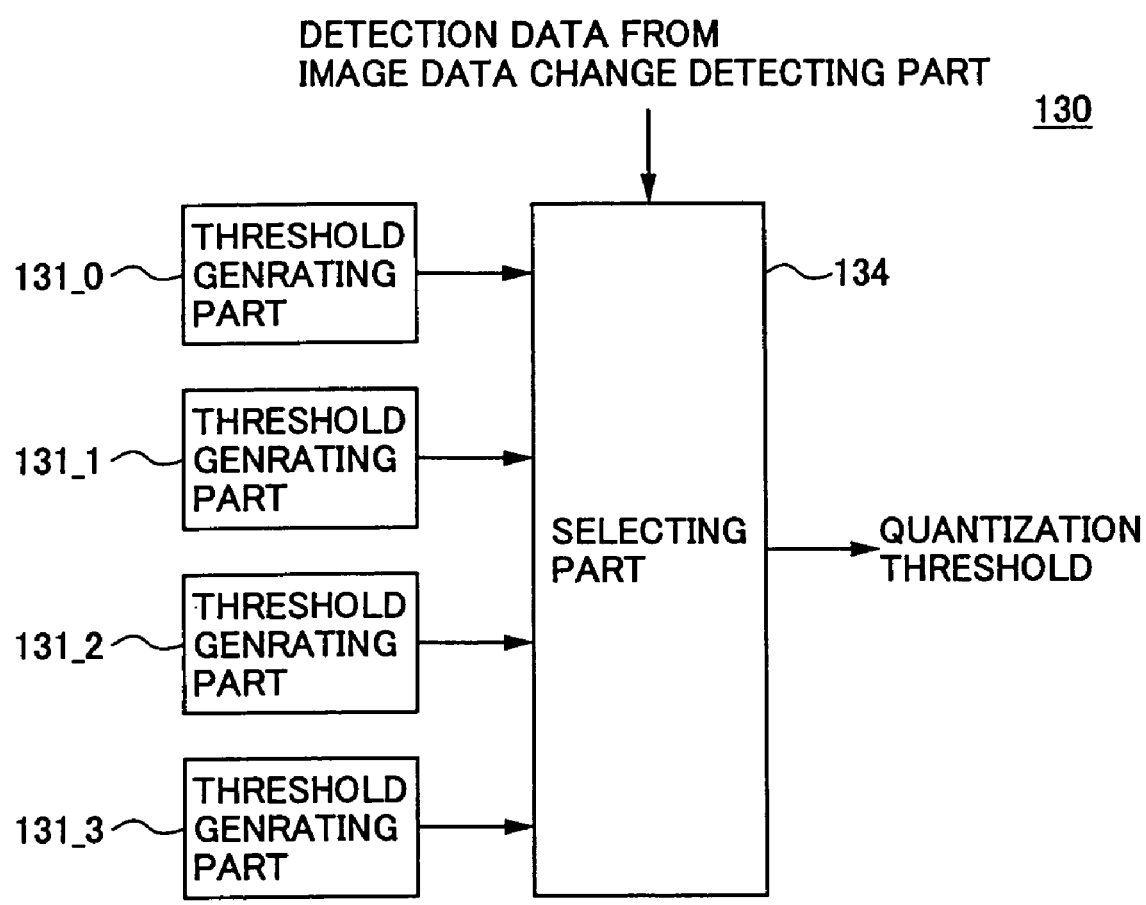
FIG. 5 shows a block diagram of another example of a quantization threshold generating part according to the present invention.

According to the second embodiment of the present invention, the quantization threshold generating part 130 in the image processing apparatus shown in FIG. 1 has the configuration shown in FIG. 5. The other configuration is the same as that shown in FIG. 1. However, the image change detecting part 120 is changed so as to output 2-bit detection data which can represent an edge degree of 4 levels from the level 0 to the level 3.

In the second embodiment, the quantization threshold generating part 130 includes four threshold generating parts 131_0 through 130_3 which generate fluctuating values having oscillation ranges corresponding to the respective levels 0 through 3 of the edge degree, respectively, and a selecting part 134 which selects one of the fluctuating values generated by the threshold generating parts 131_0 through 130_3 according to the detection data input from the image data change detecting part 120.

The threshold generating part 131_0 generates the fluctuating value fluctuating cyclically in image space with the largest oscillation range. The threshold generating part 131_1 generates the fluctuating value with the oscillating range smaller than that of the threshold generating part 131_0. The threshold generating part 131_2 generates the fluctuating value with the oscillating range smaller than that of the * threshold generating part 131_1. The threshold generating part 131_3 generates the fluctuating value with the smallest oscillating range.

Each of these threshold generating parts may have the same configuration as that of the fluctuating value generating part 131 of the above-described first embodiment except the dither thresholds. In the second embodiment, the threshold generating parts 131_0 through 130_3 use the dither threshold tables shown in FIGS. 6, 7, 8 and 9, respectively, for example. These dither threshold tables are obtained as a result of each value of the dither threshold table shown in FIG. 12 being multiplied by 8, 5, 2 and 0, respectively, and then 128 being added thereto.

When the edge degree is the level 0, the selecting part 134 selected the fluctuating value having the largest oscillation range generated by the threshold generating part 131_0, and is provided to_the comparator 111 as the quantization threshold.

Similarly, when the edge degree is one of the levels 1, 2 and 3, the selecting part 134 selects the fluctuating value generated by the respective one of the threshold generating parts 131_1, 131_2 and 131_4, and is provided to comparator 111 as the quantization threshold.

Thereby, also in the second embodiment, for a region in which the edge degree is the maximum level, the quantization threshold is fixed to 128. Further, the largest oscillating range (for the case where the edge degree is the level 0) of the quantization threshold is selected to be equal to or larger than ⅓ the range of image data, same as in the first embodiment.

Accordingly, also in the second embodiment, same as in the first embodiment, processing mainly according to the error diffusion technology having high resolution is performed for portions of characters and line drawings, while processing mainly according to the dithering technology having superior graininess and stability is performed for portions such as photographs having a little change in image data. Accordingly, it is possible to reproduce high quality images as in the first embodiment.

Further, in the second embodiment, it is possible to eliminate a part for multiplication processing (corresponding to the multiplying part 132 shown in FIG. 3) which is disadvantageous in view of costs and processing time whether the quantization threshold generating part 130 is achieved by hardware or software, and a part for adding a fixed value (corresponding to the adding part 133 shown in FIG. 3). Accordingly, in particular in a case where the number of edge degree levels is small, i.e., on the order of 4, as in the second embodiment, the memory amount needed for the threshold generating dither threshold tables is small, and, thereby, high-speed processing can be easily achieved by configuring the arrangement by hardware.

A third embodiment of the present invention will now be described.

Figure 10:
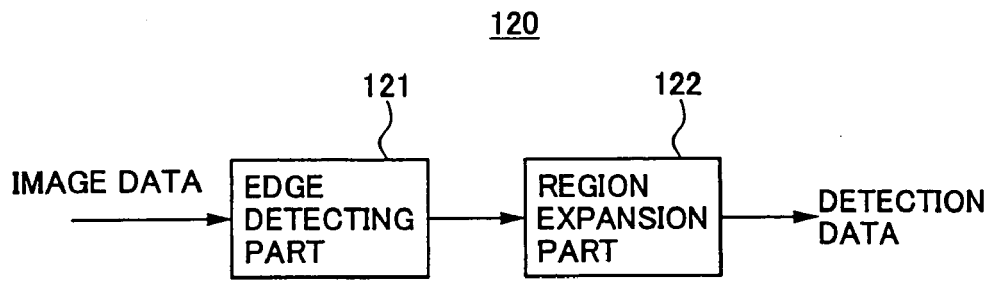
FIG. 10 shows a block diagram of one example of an image data change detecting part according to the present invention.

According to the third embodiment of the present invention, the image data change detecting part 120 in the image processing apparatus shown in FIG. 1 has the configuration shown in FIG. 10. The other configuration is the same as the above-described first embodiment.

The image data change detecting part 120 shown in FIG. 10 includes an edge detecting part 121, and a region expansion processing part 122 for detecting cyclicity of change of image data (determining a halftone-spot image having the number of halftone spots per area falling in a predetermined range).

As described above with regard to the first embodiment, the edge detecting part 121 uses differential filters such as those shown in FIGS. 2A through 2D, and detects edge amounts for four directions, and outputs the maximum (absolute value) thereof as edge, data representing the edge degree in the range from the level 0 (non-edge) to the level 8 (maximum edge degree) for example.

The region expansion processing part 122 performs region expansion in image space on the edge data provided by the edge detecting part 121. Specifically, for example, the edge data in a region of 7×7 pixels surrounding (three pixels each of before and after in the main scanning direction and three pixels each of before and after in the sub-scanning direction) a target pixel is referred to, and the maximum thereof is selected as the edge data of the target pixel. The selected edge data is output as the detection data from the image data change detecting part 120.

When image data 100 is read in resolution of 600 dpi from an original image, an expansion extent of the above-mentioned 7 pixels of the region expansion processing is approximately 0.3 mm on the original image, and this corresponds to the halftone-spot occurrence cycles per inch of approximately 86 Lpi (lines per inch). Accordingly, through the region expansion processing, for a coarse halftone-spot image lower than 86 Lpi, a portion determined as an edge by the edge detecting part 121 is evaluated as an edge, while a fine halftone-spot image equal to or higher than 86 Lpi is evaluated as an edge.

Thereby, for a peripheral portion of each halftone spot of a coarse halftone-spot image portion lower than 86 Lpi, processing mainly according to the error diffusion technique using a fixed quantization threshold or a oscillating quantization threshold with a small oscillation range. Accordingly, it is possible to reproduce halftone spots faithfully with high resolution, and to prevent moiré pattern from being generated.

For a fine halftone-spot image portion equal to or higher than 86 Lpi, also processing mainly according to the error diffusion technique using a fixed quantization threshold or a oscillating quantization threshold with a small oscillation range. Accordingly, it is possible to reproduce halftone spots faithfully with high resolution, and to prevent moiré pattern from being generated.

However, for a further fine halftone-spot image portion equal to or higher than 175 Lpi, halftone-spot components are not left in the image data 100 through previous smoothing processing as will be described later, and, thereby, same as for flat portions of image, processing mainly according to the dithering technique using an oscillating quantization threshold in a large oscillation range having superior graininess and stability is performed, and, halftone spots are produced in 150 Lpi which is the dither threshold cyclicity of the dither threshold table shown in FIG. 4 when this dither threshold table is used for the processing. Accordingly, satisfactory graininess is obtained, and banding or shade unevenness is not likely to be generated.

Thus, in the third embodiment, it is possible to reproduce an image including characters, line drawings, halftone spots, and so forth, with high image quality.

What affects sharpness of images is image-data changing points, and, it is generally possible to produce high-quality images when relatively coarse halftone spots up to the order of 50 Lpi can be faithfully reproduced. Accordingly, even though, strictly speaking, it is necessary to consider influence of MTF characteristics of a scanner used for reading an original image, characteristics of the edge detecting filters, cycle difference occurring due to shade change of halftone-spot image and so forth, it is generally possible to reproduce halftone-spot images with sufficient image quality when the expansion extent of the region expansion processing is selected to be equal to or smaller than 0.5 mm in image space.

Image data obtained from scanning an original image by a scanner and reading it is caused to pass through a smoothing filter for representing halftone smoothly. Thereby, ordinarily, smoothing is effected for a range from the order of 150 Lpi. Accordingly, cyclicity amplitude of oscillation of halftone spots finer than the order of 175 Lpi through 200 Lpi is not left unsmoothed. Therefore, moiré pattern is not likely to be generated even when such a fine halftone-spot image portion is treated as a non-edge portion and is caused to undergo processing mainly according to the dithering technique.

Figure 11A:
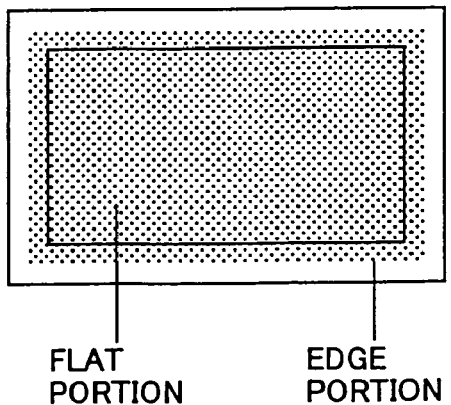
FIGS. 11A and 11B typically show an original image and an image having undergone the processing according to the present invention.
Figure 11B:
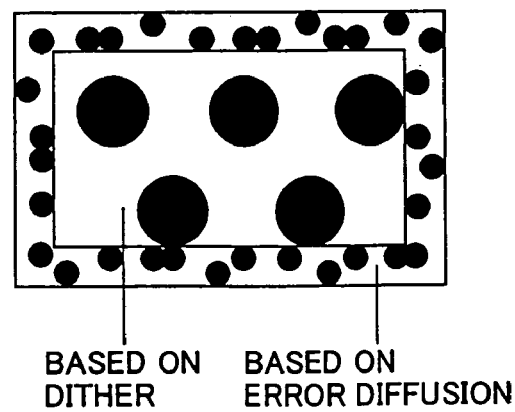

FIGS. 11A and 11B typically show an example of original image and processed image. FIG. 11A shows an original image including a rectangle having a halftone shade therein, which is determined as an image flat portion, and an edge portion separately by the edge detecting processing, and a level of edge degree is determined for the edge portion.

The flat portion of the original image is caused to undergo processing mainly according to the dithering technique with the quantization threshold oscillating in the largest oscillation range. Accordingly the flat portion is represented by halftone spots at the dither threshold cycles, as shown in FIG. 11B.

On the other hand, the rectangle contour portion which is the edge portion is caused to undergo processing mainly according to the error diffusion technique. Accordingly, a high-resolution contour shape is reproduced as in the general error diffusion process.

Actually, because the region expansion processing is performed, a portion including equal to or more than surrounding seven pixels of the edge portion is represented by isolated dots.

In the third embodiment, halftone-spot image portions having halftone-spot occurrence cycles per inch falling in a specific range are distinguished. However, it is also possible that a part of detecting halftone-spot image portions having halftone-spot occurrence cycles per inch falling in a specific range is especially provided, and, for the halftone-spot image portions having halftone-spot occurrence cycles per inch falling in the specific range detected thereby, the quantization threshold generating part 110 generates a non-oscillating quantization threshold or an oscillating quantization threshold in a small oscillation range, regardless of the edge degree detected by the edge detecting part 121, and performs processing mainly according to the error diffusion technique.

A fourth embodiment of the present invention will now be described.

In the fourth embodiment, the quantization threshold generating part 130 has the configuration shown in FIG. 5 described in the description of the second embodiment, in the general configuration according to the above-described third embodiment. However, in the fourth embodiment, the edge detecting part 121 of the image data change detecting part 120 (FIG. 10) is changed to output 2-bit edge data representing an edge degree which may vary in four levels from a level 0 to a level 3. Accordingly, the region expansion processing part 122 outputs 2-bit detection data.

The region expansion processing part 122 needs to store edge data of a target pixel and pixels surrounding the target pixel. In the fourth embodiment, the edge data is reduced from 4-bit data into 2-bit data. Accordingly, the necessary memory capacity of line memories or the like for storing it is halved.

A fifth embodiment of the present invention will now be described.

Figures 12, 13:
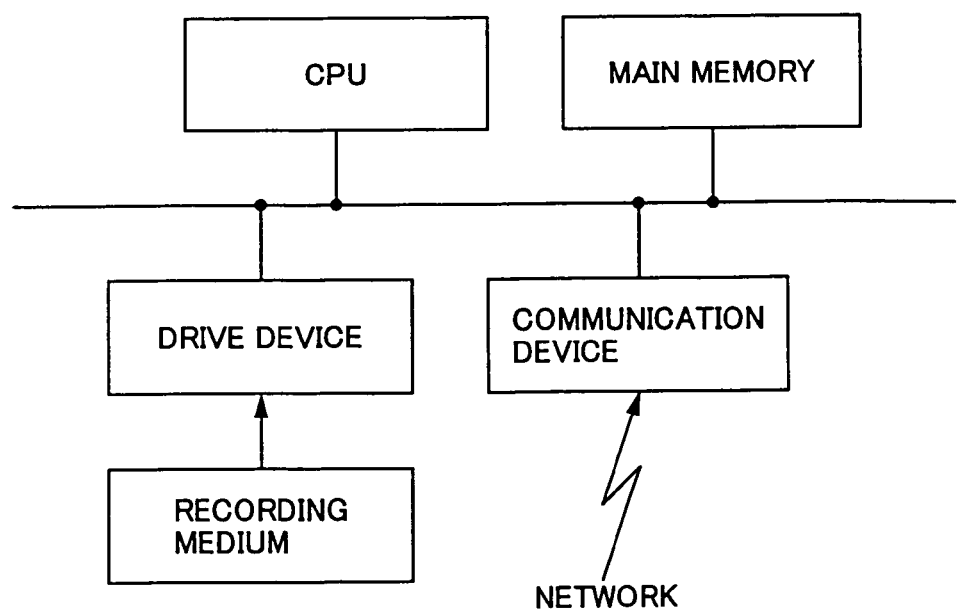
FIG. 12 shows one example of a dither threshold table for quantization threshold generation according to the present invention.
FIG. 13 shows a block diagram of one example of a general-purpose computer by which the present invention can be achieved.

In the fifth embodiment, the fluctuating value generating part 131 of the quantization threshold generating part 130 uses the dither threshold table shown in FIG. 12, in the general configuration according to the above-described first embodiment or third embodiment.

The dither threshold table shown in FIG. 12 having the 8×8 pixel size is obtained as a result of the 4×4 dither threshold table shown in FIG. 4 being modified. The dithering cycle is of 150 Lpi the same as that of the table shown in FIG. 4. However, according to the dither threshold table shown in FIG. 12, resulting halftone spots are arranged in a direction of 63.5°. Accordingly, this dither threshold table is suited for error diffusion processing.

In each of the above-described embodiments, it is possible to provide a plurality of quantization threshold generating parts 130, to cause them to generate a plurality of quantization thresholds, cause the comparator 111 of the error diffusion processing part 110 to compare the image data with each of these quantization thresholds, and, thereby, to perform multi-level quantization of more than two levels.

Each of the above-described embodiments may be achieved by software using a general-purpose computer such as that shown in FIG. 13.

In this case, a program for achieving the functions of the respective parts of the image processing apparatus is read from one of various recording media such as a floppy disk, an optical disk, a magneto-optical disk, a semiconductor storage device, and so forth through a drive device, or received from an external computer via a network through a communication device, is then loaded in a main memory, and is then executed by a CPU.

Accordingly, it is possible to achieve the image processing apparatus by the general-purpose computer. Storage areas of the main memory may be used as line memories and so forth necessary for storing signals, and signal delay, for example.

Such various computer-readable recording media (floppy disk, optical disk, magneto-optical disk, semiconductor storage device, and so forth) in which such a program is recorded are included in the present invention.

The image processing apparatus in each of the above-described embodiments may be incorporated in apparatuses relating to image formation such as a printer, a display and so forth, apparatuses relating to image reading such as a scanner, a facsimile machine, and so forth, and apparatuses relating both to image reading and image formation such as digital copier and so forth.

As one example thereof, a digital copier to which the present invention is applied will now be described (as a sixth embodiment of the present invention).

Figure 14:
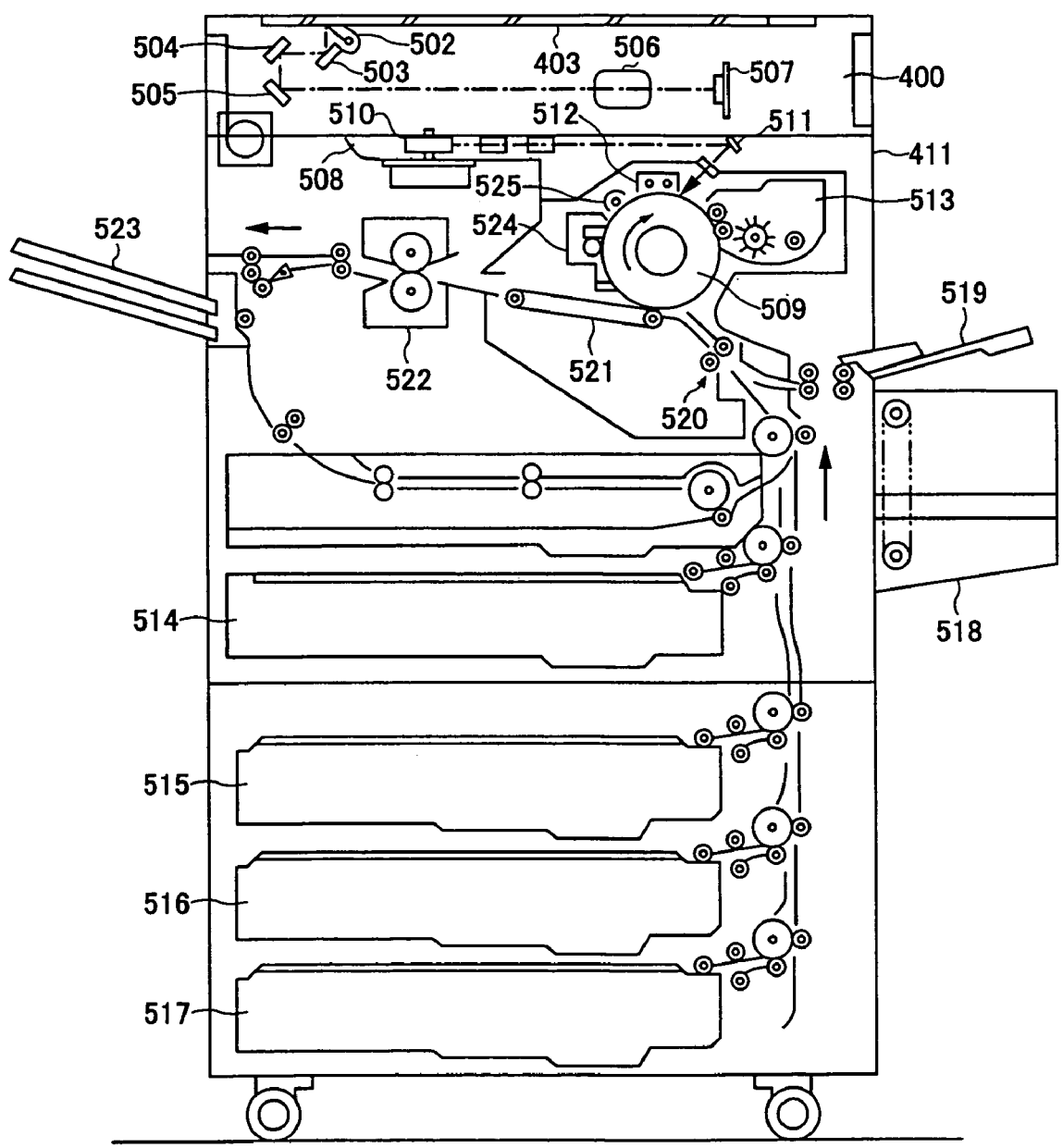
FIG. 14 shows a general configuration of a digital copier according to the present invention.

FIG. 14 shows a general sectional view of the digital copier in the sixth embodiment.

The digital copier shown in FIG. 14 includes an image reading part 400 which optically scans an original image and reads it, a laser printer 411 which serves as an image forming apparatus, and a circuit part 550 (see FIG. 15) not shown in the figure.

The image reading part 400 illuminates an original image sheet placed on a flat original table 403 by an illuminating lamp 502, forms an image from a thus-reflected light image onto an image sensor 507 such as a CCD by mirrors 503 through 505 and a lens 506. And also, by sub-scanning the original image sheet by moving the illuminating lamp 502 and mirrors 503 through 505, the image reading part 400 reads image information of the original image sheet, and converts it into an electric image signal. The analog image signal output from the image sensor 507 is input to the circuit part 550 (FIG. 15), and is processed thereby. Image data output from the circuit part 550 is input to the laser printer 411.

In the laser printer 411, a writing optical unit 508 converts image data input from the circuit part 550 into an optical signal, and exposes an image carrying body made of a photosensitive body, for example, a photosensitive body drum 509. Thereby, an electrostatic latent image corresponding to the original image is formed on the photosensitive body drum 509.

The writing optical unit 508, for example, drives a semiconductor laser according to the above-mentioned image data so as to cause it to emit a thus-intensity-modulated laser light, deflects the laser light by a rotational polygon mirror 510, and illuminates the photosensitive body drum 509 by the laser light through an f/θ lens and a reflective mirror 511.

The photosensitive body drum 509 is driven to rotate in a direction indicated by the arrow clockwise by a driving part. When being charged uniformly by a charger 512, the photosensitive body drum 509 is exposed by the writing optical unit 508, and thus has the electrostatic latent image formed thereon.

The electrostatic latent image on the photosensitive body drum 509 is developed by a developing device 513, and becomes a toner image. Further, a paper sheet is supplied by any of a plurality of paper feeding parts 514 through 518 and hand-inserting paper feeding part 519 to a registration roller 520. The registration roller 520 sends out the paper sheet in timing to the toner image on the photosensitive body drum 509.

A transfer belt 521 has a transfer bias applied thereto by a transfer power source, transfers the toner image on the photosensitive body drum 509 onto the paper sheet, and carries the paper sheet. The paper sheet having had the toner image transferred thereto is then carried to a fixing part 522 by the transfer belt 521, and the toner image is fixed onto the paper sheet, which is then ejected to an ejecting tray 523.

The photosensitive body drum 509 is cleaned by a cleaning device 524 after the toner image thereon is transferred, and electricity of the photosensitive body drum 509 is removed by an electricity removal device 525. Thus, the photosensitive body drum 509 is prepared for a subsequent image forming operation.

Figure 15:
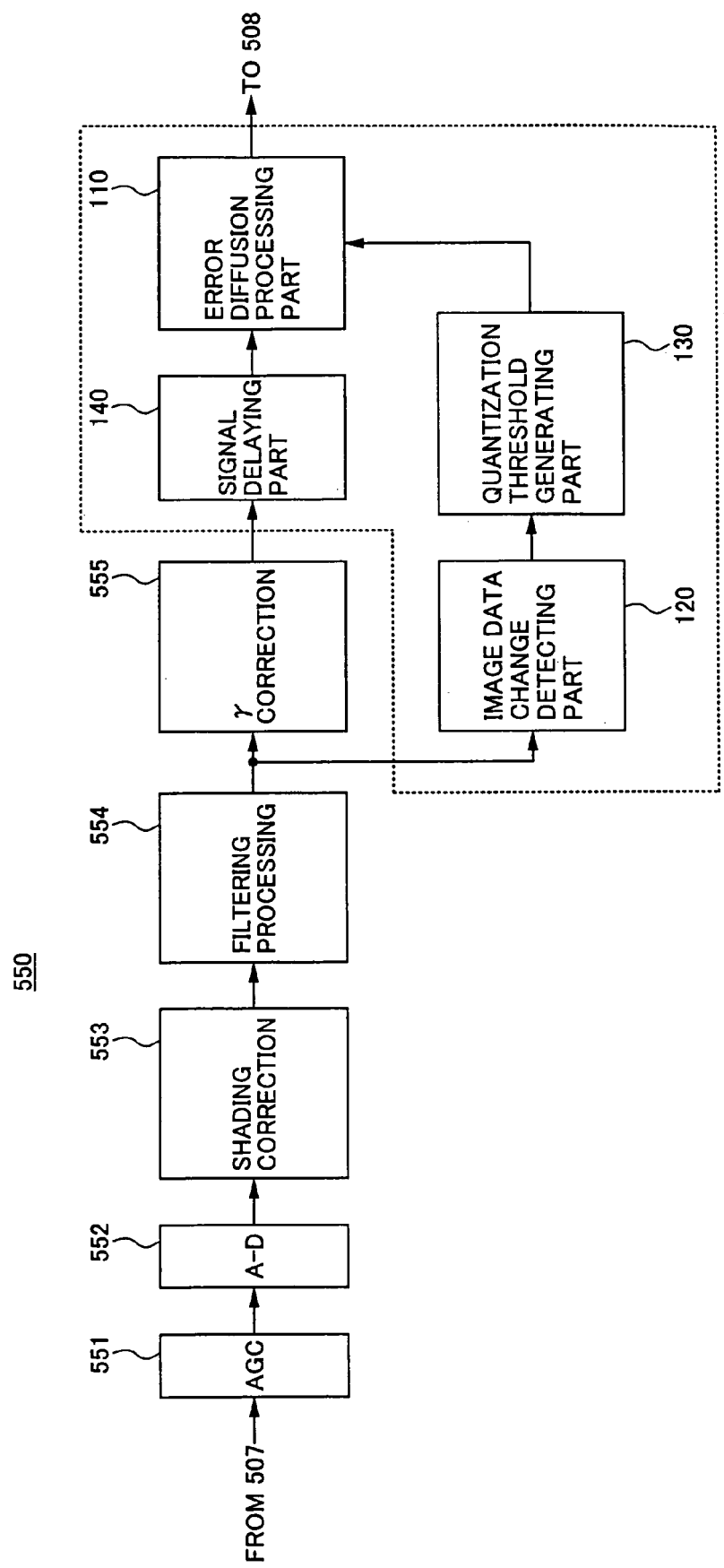
FIG. 15 shows a block diagram of one example of a circuit portion of the digital copier, shown in FIG. 14, in a simplified manner.

FIG. 15 shows a block diagram after simplifying one example of the circuit part 550 of the digital copier.

Input to the circuit part 550 is, for example, an analog image signal obtained from reading the original image in 600 dpi by the image sensor 507 of the image reading part 400. The level of this analog signal is adjusted by an AGC circuit 551, and, then, an A-D converting circuit 552 converts the thus-obtained analog signal into a digital image signal representing each pixel by 8 bits.

Further, a shading correction circuit 553 corrects for each pixel of the image sensor 507 variation in sensitivity and illumination.

Then, the image data is sent to a filter processing circuit 554, undergoes MTF correction, for example, and then, undergoes smoothing filter processing for representing a halftone image smoothly. Through the smoothing filter processing, fine halftone-spot components finer than the order of 150 Lpi are smoothed, and, thereby, fine halftone-spot components equal to or finer than 175 Lpi are almost completely removed.

The thus-obtained image data is input to the image data change detecting part 120 described above in the description of the first through fifth embodiments, and, also, is input to a γ (gamma) correction circuit 555 which then performs γ correction on the input image data for converting the shades of the image data into writing shades. The image data having undergone the γ correction is input to the error diffusion processing part 110 (FIG. 1) via the signal delaying part 555 described in the description of the first through fifth embodiments.

Detection data output from the image data change detecting part 120 is input to the quantization threshold generating part 130 described in the description of the first through fifth embodiments, and the quantization threshold is provided to the comparator 111 (FIG. 1) of the error diffuison processing part 110 from the quantization threshold generating part 130. The output data of the comparator 111 is sent to the light emitting drive control part of the semiconductor laser in the writing optical unit 508.

In the error diffusion processing part 110, the processing according to any of the above-described embodiments is performed on the image data. Accordingly, it is possible to reproduce the image read from the original image sheet with high image quality.

Actually, the digital copier can perform processing such as image-size changing processing, background removal processing, flare removal processing, other image edition processing on image data. However, description thereof is omitted. Further, the digital copier in the sixth embodiment has the functions of both image reading and image formation. Accordingly, description of image processing apparatuses such as a scanner, a printer, a facsimile machine and so forth to which the present invention is applied to is omitted.

A seventh embodiment of the present invention will now be described.

Figure 16:
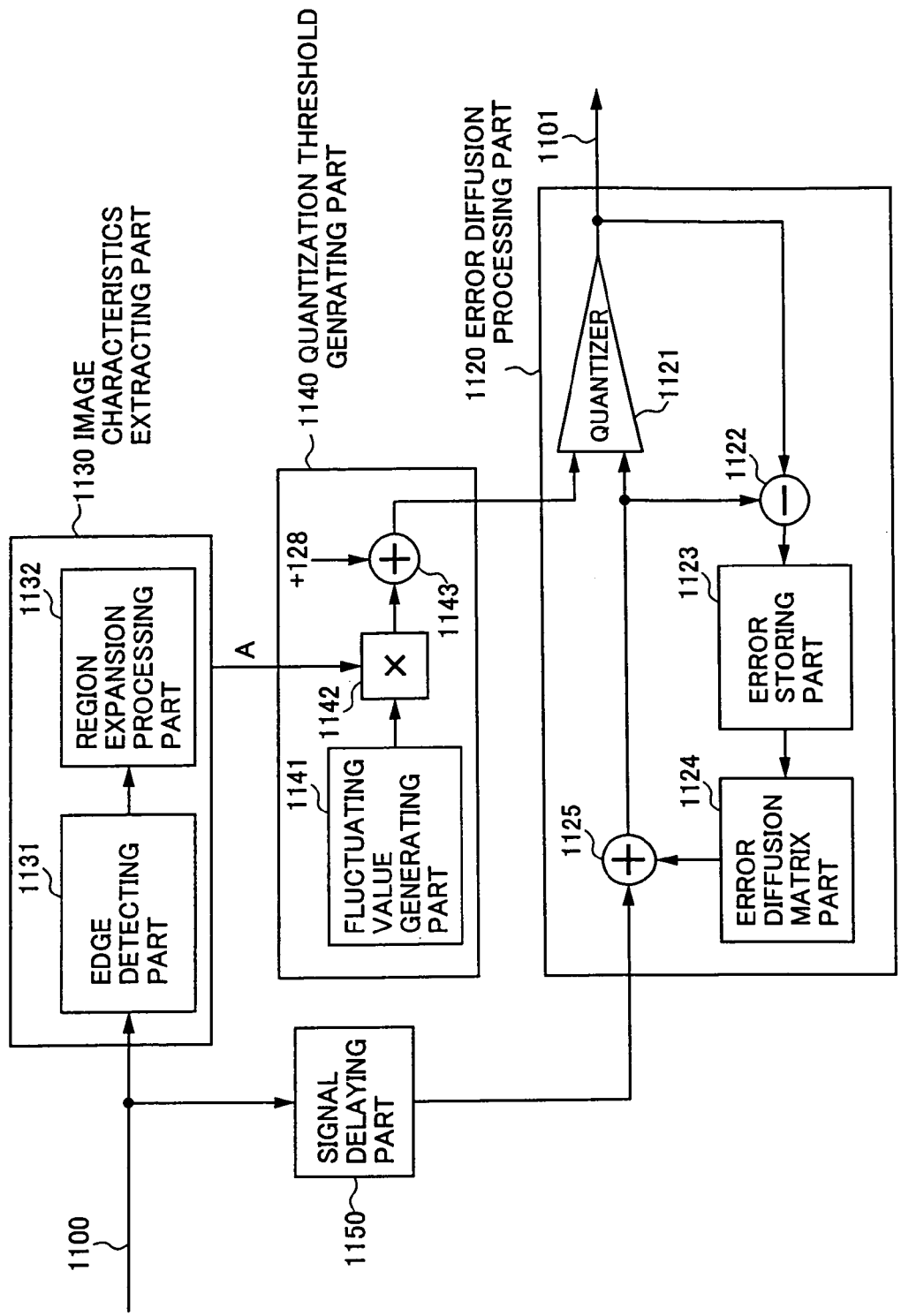
FIG. 16 shows a block diagram of another example of an image processing apparatus according to the present invention.

FIG. 16 shows a block diagram of an image processing apparatus in the seventh embodiment of the present invention.

This image processing apparatus receives multi-tone image data 1100, and outputs quantized data 1101 thereof. The image processing apparatus includes an error diffusion processing part (quantization processing part) 1120, an image characteristics extracting part 1130, a quantization threshold generating part 1140 and a signal delaying part 1150 which adjusts timing of the error diffusion processing part 1120 and image characteristics extracting part 1130.

The signal delaying part 1150 is provided as necessity arises, and, includes a desired numbers (line numbers) of line memories, for example.

The input image data 1100 is 8-bit image data read in 600 dpi by a scanner, for example. Generally, such image data 1100 is input after passing through a smoothing filter for expressing halftone smoothly. Ordinarily, as mentioned above, smoothing is performed for image cycles per inch from the order of 150 Lpi. Accordingly, the image data 1100 does not have high-cycle-per-inch components equal to or higher than 175 Lpi of a high-cycle-per-inch halftone-spot image used in gravure printing, left therein.

The error diffusion processing part 1120 uses a quantization threshold generated by the quantization threshold generating part 1140, and quantizes input image data by error diffusion method.

As shown in FIG. 16, in the seventh embodiment, the error diffusion processing part 1120 includes a quantizer (comparator) 1121, an error calculating part 1122, an error storing part 1123, an error diffusion matrix part 1124, and an error adding part 1125.

Image data 1100 has timing thereof adjusted by the signal delaying part 1150 and is input to the error adding part 1125. The image data having had a diffusion error added thereto by the error adding part 1125 is input to the quantizer 1121. The quantizer 1121 quantizes the input image data using the quantization threshold given by the quantization threshold generating part 1140, and outputs the quantization result as quantized data 1101.

For the sake of simplification of description, it is assumed that the quantization threshold generating part 1140 generates a single quantization threshold, and, the quantizer 1121 outputs "1" when the input image data is equal to or larger than the quantization threshold each time, and outputs "0" in the other cases, as 1-bit quantized image data 1101. However, it is not necessary to be limited thereto. For example, the quantization threshold generating part 1140 may generate three quantization thresholds, the quantizer 1121 may use these quantization thresholds and quantize the input image data into 4 levels, and may output 2-bit quantized image data 1101.

The error calculating part 1122 calculates the quantization error of the quantizer 1121. Because the image data processed here is 8-bit image data, "1" of the output image data 1101 is processed as 255 (decimal notation) and "0" as 0 (decimal) in this error calculation, for example.

The calculated quantization error is temporarily stored in the error storing part 1123. The error storing part 1123 is used for storing error data concerning already processed pixels surrounding a target pixel. Because diffusion is made up to the pixel two lines ahead of the target pixel in this embodiment, two line memories for two lines, for example, are used as the error storing part 1123.

The error diffusion matrix part 1124 calculates the diffusion error to be added to a subsequent target pixel from the quantization error data stored in the error storing part 1123. In this embodiment, as shown in FIG. 17, an error diffusion matrix having a size of three pixels in the sub-scanning direction and five pixels in the main scanning direction is used, and the diffusion error data is calculated.

In FIG. 17, * corresponds to the position of the subsequent target pixel, and a, b, c, . . . , k and l are coefficients (the total of which is 32) corresponding to the positions of surrounding already processed 12 pixels. The error diffusion matrix part 1125 provides a value obtained as a result of dividing by 32 the total of values obtained from multiplying the respective quantization errors concerning those already processed 12 pixels by the corresponding coefficients 'a' through 'l', respectively, as the diffusion error for the subsequent target pixel, to the error adding part 1125.

The image characteristics extracting part 1130 includes an edge detecting part 1131 and a region expansion processing part 1132.

The edge detecting part 1131 detects an edge degree of the image data 1100, and outputs the detected edge degree as 4-bit detection data which may vary from a level 0 (maximum edge degree) to a level 8 (non edge).

Further specifically, 4 types of 5×5 differential filters shown in FIG. 18 are used, respective edge amounts for four directions, i.e., the main scanning direction, sub-scanning direction, and directions ±45° oblique from the main scanning direction, are detected, the one, the absolute value of which is the largest, is selected from the detected four edge amounts, and the absolute value of the selected edge amount is quantized into detection data representing the edge degree which may vary 9 levels from the level 0 to the level 8.

A method of detecting the edge amount by using the differential filters shown in FIG. 18 is to obtain the total of values obtained from multiplying respective image data for pixels surrounding a target pixel at pixel positions shown in each of the filters shown in FIG. 18 by the corresponding coefficients shown in the figures, respectively, for example.

The region expansion processing part 1132 performs region expansion processing of the extent of 7 pixels on the edge data provided by the edge detecting part 1131. Specifically, for example, the edge data in a region of 7×7 pixels surrounding (three pixels each of before and after in the main scanning direction and three pixels each of before and after in the sub-scanning direction) the target pixel provided by the edge detecting part 1131 is referred to, and the minimum edge level (maximum edge degree) thereof is selected as the edge level of the target pixel. The selected edge level is output as 4-bit edge data. This edge data is given to the quantization threshold generating part 1140.

In the present embodiment, the quantization threshold generating part 1140 generates the quantization threshold which cyclically oscillates in image space in the oscillation range according to the edge level expressed by the edge data output from the region expansion processing part 1132, and provides the quantization threshold to the quantizer 1121 of the error diffusion processing part 1120. The quantization threshold generating part 1140 includes a fluctuating value generating part (dither threshold generating part) 1141, a multiplying part 1142 multiplying the output value of the fluctuating value generating part 1141 by a multiplication factor (0 through 8) corresponding to the edge level indicated by the edge data, and an adding part 1143 adding a fixed value to the output value of the multiplying part 1142.

The fluctuating value generating part 1141 uses a dot-concentration 4×4 dither threshold table such as that shown in FIG. 19, in which thresholds from −7 to +8 around 0 are arranged so that these thresholds increase spirally from the center thereof, for example. This table is applied to each set of pixels of an original image so as to cover the entire area of the original image. Then, the above-mentioned coefficients of the dither threshold table are read out according to target-pixel positions. Thereby, the fluctuating value generating part 1141 generates the fluctuating value which oscillates between −7 and +8 cyclically in the image space.

The dither threshold cycle is 4 pixels which corresponds to 150 Lpi in a case where image formation of 600 dpi.

This fluctuating value generating part 1141 can be easily achieved by using a ROM storing the dither threshold table, counters counting timing pulses in the main and sub-scanning of the image data so as to generate reading addresses for the ROM, and so forth.

The multiplying part 1142 multiplies the fluctuating value by the multiplication factor 8 when the edge degree represented by the detection data from the image data change detecting part 120 is the level 8 (non edge), the multiplication factor 7 when the edge degree is the level 7, the multiplication factor 6 when the edge degree is the level 6, the multiplication factor 5 when the edge degree is the level 5, the multiplication factor 4 when the edge degree is the level 4, the multiplication factor 3 when the edge degree is the level 3, the multiplication factor 2 when the edge degree is the level 3, the multiplication factor 1 when the edge degree is the level 1 and the multiplication factor 0 when the edge degree is the level 1 (maximum edge degree).

Accordingly, the output value of the multiplying part 1142 oscillates in the maximum oscillation range between +64 and −56 when the edge degree is the level 8 (non edge). The fixed value added by the adding part 1143 is selected to be +128 (decimal) which is the medium value of the range of the image data.

Accordingly, the quantization threshold provided to the quantizer 1121 oscillates around +128, and the maximum oscillation range thereof is 120 (between +192 and −72).

When the quantized data 1101 of the thus-configured image processing apparatus is provided to an electrophotographic printer, it is possible to produce high-grade images, at high resolution for image-data changing points or halftone-spot images of relatively low halftone-spot cycles per inch (coarse halftone-spot images), smooth and stable for photographs, portions in which image data changes gently, or halftone-spot images of high halftone-spot cycles per inch (fine halftone-spot images), and in which these different regions match each other without sense of incongruity.

Specifically, for a portion in an image in which change of image data is sharp and the edge level is the level 0 (where the edge degree is highest) such as an edge portion of a character or a line drawing, the quantization threshold generated by the quantization threshold generating part 1140 is fixed to +128. Thereby, a true or pure error diffusion method is used for quantization using the fixed threshold in the error diffusion processing part 1120. Accordingly, it is possible to form a high-resolution image.

For a portion such as a photograph or a flat portion of an image in which the edge degree is low (the edge level is high), the oscillation range of the quantization threshold generated by the quantization threshold generating part 1140 is large. Accordingly, the quantization processing of the error diffusion processing part 1120 is processing mainly according to the dithering technique in which dots are concentrated. Thereby, the image data is converted to form halftone spots at the dither threshold cycles, and an image based on dithering having superior graininess and stability is formed.

Further, because the halftone-spot cycles per inch are selected to 150 Lpi in which the cyclicity is not remarkable to the human eyes, it is possible to form smooth and high-grade images.

In the image processing apparatus in the seventh embodiment, positions at which dots are generated shift due to diffusion of quantization errors. Accordingly, the dither threshold matrix merely controls the dot generation positions, and the dot generation positions may shift from the positions according to the arrangement of the thresholds in the dither threshold matrix. However, it has been confirmed that, when the dither threshold matrix such that halftone spots having an image space frequency (halftone-spot cycles per inch) in the range of 100 Lpi through 250 Lpi are formed thereby is used by the dither threshold generating part 1141 for image regions processed mainly according to the dithering technique, the cyclicity is not likely to be remarkable to human eyes, and, also, because dot concentration is performed in the range of resolution of electrophotographic printer and so forth, it is possible to form smooth and high-grade images having a little deformation of halftone spots and superior graininess.

Further, at the boundary between the region in which the edge degree is high and the region in which the edge degree is low, the oscillation range of the quantization threshold changes gradually according to the edge degree. Thereby, the characteristics of the processing is smoothly switched from the processing mainly according to the error diffusion technique to the processing mainly according to the dithering technique, and vise versa. Accordingly, it is possible to form images in which there is no incongruousness in boundaries between both image regions.

The region expansion processing part 1132 of the image characteristics extracting part 1130 performs region expansion processing of the extent of 7 pixels. In the case of 600 dpi, the expansion extent of the above-mentioned 7 pixels of the region expansion processing corresponds to approximately 0.3 mm on the original image, and this corresponds to the halftone-spot cycles per inch of approximately 86 Lpi (lines per inch). Accordingly, through the region expansion processing, a fine halftone-spot image higher than 86 Lpi is evaluated as an edge portion, and, therefor, processing mainly according to the error diffusion technique using a fixed quantization threshold or a oscillating quantization threshold in a small oscillation range is performed in the error diffusion processing part 1120. Thereby, it is possible to reproduce halftone spots faithfully with high resolution, and to prevent moiré patterns from being generated.

As described above, halftone-spot components of high halftone-spot cycles per inch equal to or higher than 175 Lpi are not left in the smoothed image data 1100. Accordingly, for halftone-spot images of such high halftone-spot cycles per inch, the edge level is the level 8 or high level (low edge degree). Thereby, they are processed mainly according to the dithering technique using oscillating quantization threshold in a wide oscillation range same as for image flat portions. Thereby, they are converted into halftone spots at the dither threshold cycles according to the halftone-spot cycles per inch of 150 Lpi. Accordingly, it is possible to form images superior in graininess and stability. Further, because halftone-spot components are removed from the image data 1100, no moiré patterns are generated.

For halftone-spot images of low halftone-spot cycles per inch lower than 86 Lpi, halftone-spot boundary portions evaluated as edges are processed mainly according to the error diffusion technique using fixed quantization thresholds or oscillating quantization thresholds in narrow oscillation ranges. Accordingly, the halftone spots are reproduced faithfully, and also, moiré patterns are prevented from being generated. Further, halftone-spot central portions not evaluated as edges are processed mainly according to the dithering technique using oscillating quantization thresholds in wide oscillation ranges. Accordingly, it is possible to express these portions with satisfactory stability and graininess.

An eighth embodiment of the present invention will now be described.

In the eighth embodiment of the present invention, in an image processing apparatus having the configuration shown in FIG. 16, the fluctuating value generating part 1141 of the dither threshold generating part 1140 uses the 8×8 dither threshold matrix shown in FIG. 20, and generates a dither threshold oscillating in image space cyclically between −7 and +8. The other configuration is the same as that of the above-described seventh embodiment.

The dither threshold matrix shown in FIG. 20 is obtained as a result of the 4×4 basic dither thresholds enclosed by the thick line (the same as the dither threshold matrix shown in FIG. 19) being copied and four of them being combined, and thus the basic dither threshold matrix being magnified to a 8×8 size. In this arrangement, the basic dither matrixes adjacent in the main scanning direction are shifted in the sub-scanning direction relatively by the half phase.

By using such a dither threshold matrix, for image flat portions for which processing mainly based on the dithering technique is performed, where halftone spots corresponding to 150 Lpi are formed in 600 dpi, because halftone-spot development starting points are arranged staggeringly, it is possible to form images superior in stability especially for light-shade portions.

Further, halftone-spot arrangement is made with a screen angle of approximately 63.5°, such a dither threshold matrix is suited for error diffusion processing, causes no deformation of halftone spots, and provides satisfactory graininess.

Furthermore, when this dither threshold matrix is used, the cycle of occurrences of the halftone-spot development starting points is 4 pixels in the sub-scanning direction while the same is 8 pixel in the main scanning direction. This increases the stability of images because the intervals of on/off of dots in light-shade image flat portions are long.

The dither threshold generating part 1141 does not necessarily need to have a ROM storing the 8×8 dither threshold matrix shown in FIG. 20, but may have a ROM storing the 4×4 dither threshold matrix, and may generate the thresholds of the 8×8 dither threshold matrix by controlling reading addresses.

A ninth embodiment of the present invention will now be described.

In the ninth embodiment, in an image processing apparatus having the configuration shown in FIG. 16, the fluctuating value generating part 1141 of the dither threshold generating part 1140 uses the 4×4 dither threshold matrix shown in FIG. 21 in which the thresholds from −7 to +8 are arranged in a manner such that the threshold increases in the sub-scanning direction, and generates a dither threshold oscillating in image space cyclically between −7 and +8. The other configuration is the same as that of the above-described seventh embodiment.

By using such a dither threshold matrix, in image flat portions or the like processed based on the dithering technique, stable and smooth image are formed by lines extending in the sub-scanning direction in 150 Lpi as a result of dots being arranged continuously in the sub-scanning direction through development of the dots at cycles corresponding to 150 Lpi in 600 dpi.

A tenth embodiment of the present invention will now be described.

In the tenth embodiment, in an image processing apparatus having the configuration shown in FIG. 16, the fluctuating value generating part 1141 of the dither threshold generating part 1140 uses the 4×8 dither threshold matrix shown in FIG. 22 in which the thresholds from −16 to +15 are arranged in a manner such that the threshold increases in the sub-scanning direction, and generates a dither threshold oscillating in the image space cyclically between −16 and +15. The other configuration is the same as that of the above-described seventh embodiment.

By using such a dither threshold matrix, similarly as in the above-described ninth embodiment, in image flat portions or the like processed based on the dithering technique, stable and smooth images are formed by lines extending in the sub-scanning direction in 150 Lpi as a result of dots being arranged continuously in the sub-scanning direction through development of the dots at cycles corresponding to 150 Lpi in 600 dpi.

An eleventh embodiment of the present invention will now be described.

In the eleventh embodiment, in an image processing apparatus having the configuration shown in FIG. 16, the fluctuating value generating part 1141 of the dither threshold generating part 1140 uses the 6×6 dither threshold matrix shown in FIG. 23, and generates a dither threshold oscillating in image space cyclically between −9 and +8. The other configuration is the same as that of the above-described seventh embodiment.

This 6×6 dither threshold matrix is obtained from copying the basic dither matrix enclosed by the broken line in FIG. 23 and combining two of them in a manner such as to have the screen angle of 45°. For the sake of easy understanding of this arrangement relationship, four of the 6×6 dither threshold matrixes are arranged in FIG. 23. In the above-mentioned basic threshold matrix, the thresholds from −9 to +8 are arranged in a manner such that the threshold increases approximately spirally.

By using such a 6×6 dither threshold matrix, in image flat portions or the like processed based on the dithering technique, where halftone spots corresponding to approximately 141 Lpi are formed in 600 dpi, the halftone spots are arranged with the direction of 450. Such arrangement with the direction of about 450 is not likely to be remarkable to human eyes.

Further, even when 90° rotation processing is performed on the image data 1100 antecedent to the present image processing apparatus (or 90° rotation processing is performed on the quantized data 1101 subsequent to the present image processing apparatus), the direction of the arrangement of halftone spots does not change substantially. Thereby, impression provided from the image formed doe not change whether or not the rotation processing is performed.

In a digital copier, a function is provided such that rotational sorting is performed instead of mechanical sorting. In the rotational sorting, when a plurality of pages of original images are copied for a plurality of copies, the first copy thereof is printed out without rotation processing performed thereon, the subsequent copy is printed out with 90° rotation processing performed thereon, the further subsequent copy thereof is printed out without rotation processing performed thereon, . . . . Thus, rotation processing is performed alternately for each copy, and, also, the paper feeding direction is switched according to whether or not rotation processing is performed.

When such rotational sorting is performed, it is not preferable that impression from the image differs whether or not rotation processing is performed. According to the eleventh embodiment, the direction of arrangement of halftone spots of image flat portions and so forth is substantially uniform regardless of whether or not rotation processing is performed. Accordingly, a difference is not generated such as to cause incongruousness between a copied image having undergone rotation processing and a copied image not having undergone rotation processing, even rotational sorting is performed.

A twelfth embodiment of the present invention will now be described.

Figure 24:
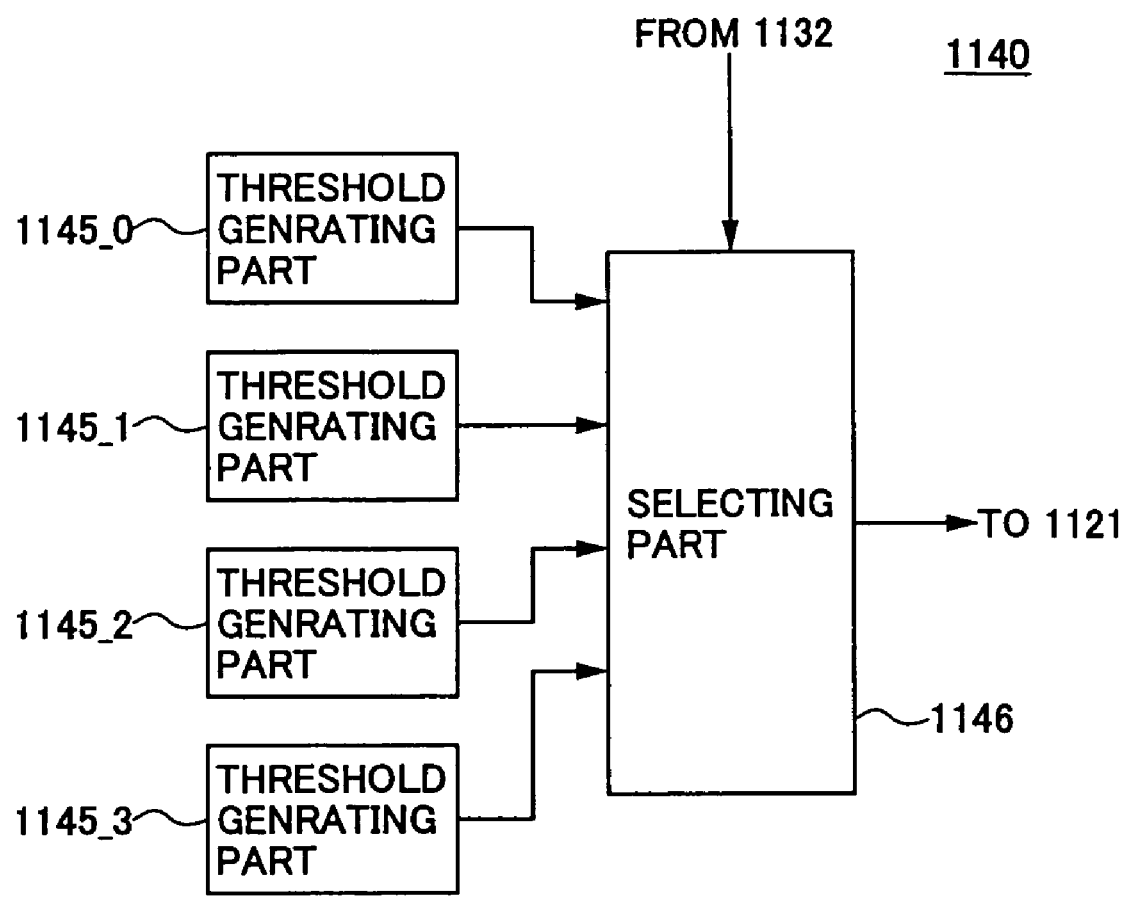
FIG. 24 shows a block diagram of another example of a quantization threshold generating part according to the present invention.

In the twelfth embodiment, in an image processing apparatus having the configuration shown in FIG. 16, the quantization threshold generating part 1140 has the configuration shown in FIG. 24.

Further, the image change detecting part 1131 of the image characteristics extracting part 1130 (FIG. 16) is changed so as to quantize the edge amount into 2-bit edge data which can represent 4 edge levels from the level 0 (the highest edge degree) to the level 3 (non edge).

In the twelfth embodiment, the quantization threshold generating part 1140 includes four threshold generating parts 1145_0 through 1145_3 which generate fluctuating values having oscillation ranges corresponding to the respective levels 0 through 3 of the edge degree, respectively, and a selecting part 1146 which selects one of these fluctuating values generated by the threshold generating parts 1145_0 through 1145_3 according to the edge level indicated by the edge data input from the image characteristics extracting part 1130, and provides the selected fluctuating value to the quantizer 1121 of the error diffuison processing part 1120 (FIG. 16) as the dither threshold.

The threshold generating part 1145_3 corresponding to the edge level 3 (non edge) uses the dither threshold matrix obtained from multiplying each threshold of the dither threshold matrix used in any of the above-described seventh, eighth, ninth, tenth and eleventh (FIGS. 19 through 23) by 8, and then, adding 128 thereto, and generates the threshold oscillating in the maximum oscillating range.

The threshold generating part 1145_2 corresponding to the edge level 2 uses the dither threshold matrix obtained from multiplying each threshold of that dither threshold matrix in the above-described embodiment by 5, and then, adding 128 thereto, and generates the threshold oscillating in the smaller oscillating range.

The threshold generating part 1145_1 corresponding to the edge level 1 uses the dither threshold matrix obtained from multiplying each threshold of that dither threshold matrix in the above-described embodiment by 2, and then, adding 128 thereto, and generates the threshold oscillating in the further smaller oscillating range.

The threshold generating part 1145_0 corresponding to the edge level 0 (the highest edge degree) generates the fixed value (+128).

Accordingly, also in the twelfth embodiment, it is obvious that, the same quantization threshold generating processing as that of any of the seventh, ninth, eighth, tenth and eleventh embodiments is performed, and, thereby, high-grade images can be formed.

In the twelfth embodiment, it is possible to eliminate a part for multiplication processing (corresponding to the multiplying part 1142 shown in FIG. 16) which is disadvantageous in view of costs and processing time whether the quantization threshold generating part 1140 is achieved by hardware or software.

Further, although the region expansion processing part 1132 needs to temporarily store the edge data for the plurality of lines corresponding to the region expansion extent, it is possible to reduce the capacity of line memories or the like for the temporarily storage as the edge data is reduced to 2-bit data.

Furthermore, because the number of edge degree levels is small, i.e., 4, the memory amount needed for the threshold generating dither threshold tables in the threshold generating parts 1145_0 through 1145_3 is small.

Further, although the storage capacity of the region expansion processing part 1132 is not reduced, it is also possible that the edge detecting part 1131 outputs the nine edge levels, and the nine edge levels are converted into four levels in the region expansion processing part 1132 and are output therefrom.

A thirteenth embodiment of the present invention will now be described.

In the thirteenth embodiment, in an image processing apparatus having the configuration shown in FIG. 16, a mode signal (not shown in the figure) is input externally to the fluctuating value generating part 1141 of the quantization threshold generating part 1140. Then, the fluctuating value generating part 1141 switches a dither threshold matrix used for dither threshold generation according to a mode indicated by the mode signal.

Figures 25A, 25B, 25C:
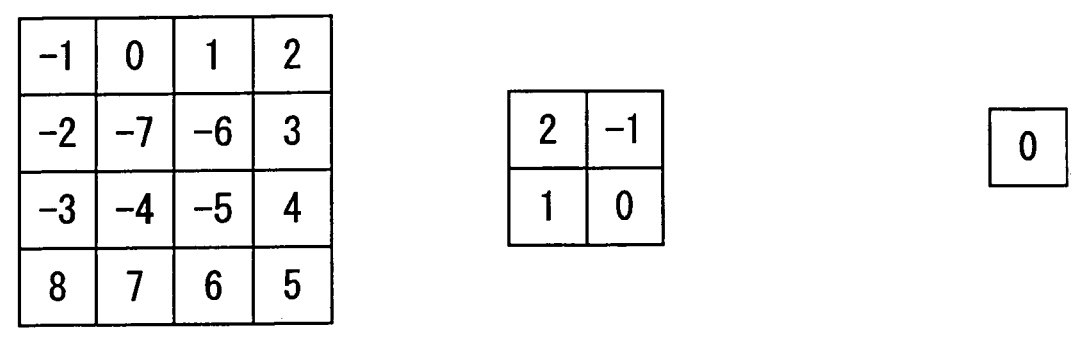

For example, the fluctuating value generating part 1141 has the 4×4 dither threshold matrix for 'photograph mode' such as that shown in FIG. 25A, the 2×2 dither threshold matrix for 'character/photograph mode' such as that shown in FIG. 25B and the 1×1 dither threshold matrix for 'character mode' such as that shown in FIG. 25C, for example, and selects the dither threshold matrix corresponding to the mode specified by the mode signal. The dither threshold matrix shown in FIG. 25A is the same as that shown in FIG. 19.

When the photograph mode is specified, the dither threshold matrix shown in FIG. 25A is selected. Accordingly, for non-edge portions, smooth images superior in stability are formed by halftone spots having image space frequency of 150 Lpi in 600 dpi. Accordingly, this mode is suited for outputting images having a little change in image data such as photographs.

When the character mode is specified, the dither threshold matrix shown in FIG. 25C is selected. Accordingly, the quantization threshold is fixed to +128, and quantization is performed by the pure or true error diffusion method for all the area of the image. Thereby, images superior in resolution are formed. Accordingly, the character mode is suited for images of characters or line drawings for which high resolution is desired.

The character/photograph mode is suited for outputting images having characteristics intermediate between those of the above-mentioned two modes. When the character/photograph mode is specified, the dither threshold matrix shown in FIG. 25B is selected. Accordingly, for non-edge portions, smooth images superior in stability are formed by halftone spots having image space frequency of 300 Lpi in 600 dpi.

In such a configuration in which a plurality of modes can be specified, and the dither threshold matrix is switched according to the specified mode, suitable quantization processing is performed on image data having various characteristics, and, thereby, it is possible to form well-balanced high-grade images.

For the purpose of achieving a similar object, it is also possible to switch the dither threshold matrix in each of the threshold generating parts 145_0 through 145_3 in the quantization threshold generating part 1140 shown in FIG. 24 according to the specified mode.

Each of the above-described seventh, eighth, ninth, tenth, eleventh, twelfth and thirteenth embodiments may be achieved by software using a general-purpose computer such as that shown in FIG. 13.

In this case, a program for achieving the functions of the respective parts of the image processing apparatus is read from one of various recording media such as a floppy disk, an optical disk, a magneto-optical disk, a semiconductor storage device, and so forth through a suitable drive device, or received from an external computer via a network through a communication device, is then loaded in a main memory, and is then executed by a CPU.

Accordingly, it is possible to achieve the image processing apparatus by the general-purpose computer. Storage areas of the main memory may be used as line memories and so forth necessary for storing signals, and signal delay for example.

Such various computer-readable recording media (floppy disk, optical disk, magneto-optical disk, semiconductor storage device, and so forth) in which such a program is recorded are included in the present invention.

The image processing apparatus in any of the above-described seventh, eighth, ninth, tenth, eleventh, twelfth and thirteenth embodiments may be incorporated in apparatuses relating to image formation such as a printer, a display and so forth, apparatuses relating to image reading such as a scanner, a facsimile machine, and so forth, and apparatuses relating both to image reading and image formation such as a digital copier and so forth.

As one example thereof, a digital copier to which the above-mentioned embodiment of the present invention is applied will now be described (as a fourteenth embodiment of the present invention).

The general sectional view of the digital copier in the fourteenth embodiment is the same as that shown in FIG. 14, and all the parts/components thereof are the same as those shown in FIG. 14, the description thereof being omitted. However, the circuit part 550 of the sixth embodiment is replaced by a circuit part 1550 (FIG. 26) in the fourteenth embodiment.

Figure 26:
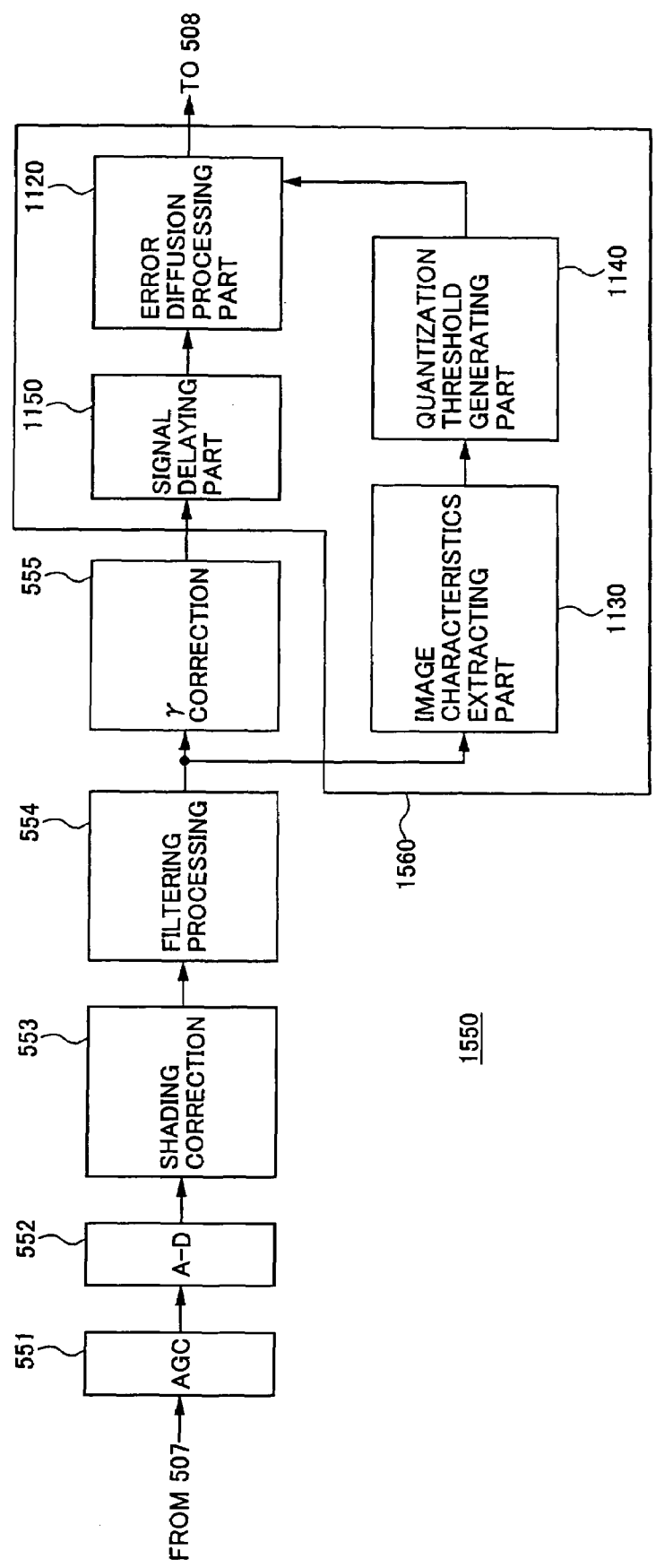
FIG. 26 shows a block diagram of another example of a circuit portion of the digital copier according to the present invention, in a simplified manner.

FIG. 26 shows a simplified block diagram of one example of the circuit part 1550 of that digital copier.

The circuit part 1550 is the same as the circuit part 550 shown in FIG. 15 except that the error diffusion processing part 110, image data change detecting part 120, quantization threshold generating part 130 and signal delaying part 140 are replaced by a halftone processing part 1560. The same reference numerals are given to the same parts as those of FIG. 15, and description thereof is omitted.

The halftone processing part 1560 is the image processing apparatus in any of the above-described seventh, eighth, ninth, tenth, eleventh, twelfth and thirteenth embodiments.

The image data having undergone the filter processing performed by the filter processing circuit 554 is input to the image characteristics extracting part 1130. The image data having undergone the γ correction performed by the γ correction circuit 555 is input to the error diffusion processing part 1120 via the signal delaying part 1150. The quantized data output from the error diffusion processing part 1120 is sent to the light emitting control part of the semiconductor laser in the writing optical unit 508.

It is possible to omit the signal delaying part 1150 as a result of the filter processing circuit 554 adjusting timing of the signal to be output to the image characteristics extracting part 1130.

Further, in the digital copier, size changing processing of image data in the main scanning direction may be performed antecedent to the γ correction circuit 555, for example, background removal processing and/or flare removal processing may be performed between the γ correction part 555 and halftone processing part 1560, for example, and/or 90° rotation processing may be performed antecedent to the filter processing part 554 or subsequent to the halftone processing part 1560, for example, description thereof being omitted.

A fifteenth embodiment of the present invention will now be described.

In the fifteenth embodiment, in an image processing apparatus having the configuration shown in FIG. 16, the fluctuating value generating part 1141 uses 4×4 dither threshold tables such as those shown in FIGS. 27A and 27B, in each of which thresholds from −7 to +8 around 0 are arranged so that these thresholds increase spirally outward from the center thereof, for example. The other configuration is the same as that of the seventh embodiment.

Such a table is applied to each set of pixels of an original image so as to cover the entire area of the original image.

Then, the above-mentioned coefficients of the dither threshold table are read out according to the target-pixel positions. Thereby, the fluctuating value generating part 1141 generates the fluctuating value which oscillates between −7 and +8 cyclically in image space.

The dither threshold cycle is 4 pixels which corresponds to 150 Lpi in a case where image formation of 600 dpi.

This fluctuating value generating part 1141 can be easily achieved by using a ROM storing the dither threshold table, counters counting timing pulses in the main and sub-scanning of the image data so as to generate reading addresses for the ROM, and so forth.

The multiplying part 1142 multiplies the fluctuating value (output value of the fluctuating value generating part 1141) by the multiplication factor 8 when the edge degree represented by the detection data from the image data change detecting part 120 is the level 8 (non edge), the multiplication factor 7 when the edge degree is the level 7, the multiplication factor 6 when the edge degree is the level 6, the multiplication factor 5 when the edge degree is the level 5, the multiplication factor 4 when the edge degree is the level 4, the multiplication factor 3 when the edge degree is the level 3, the multiplication factor 2 when the edge degree is the level 6, the multiplication factor 6 when the edge degree is the level 7 and the multiplication factor 0 when the edge degree is the level 0 (maximum edge degree).

Accordingly, the output value of the multiplying part 1142 oscillates in the maximum oscillation range between +64 and −56 when the edge degree is the level 8 (non edge). The fixed value added by the adding part 1143 is selected to be +128 (decimal) which is the medium value of the range of the image data.

Accordingly, the quantization threshold provided to the quantizer 1121 oscillates around +128, and the maximum oscillation range thereof is 120 (between +192 and −72).

When the quantized data 1101 of the thus-configured image processing apparatus is provided to an electrophotographic printer or the like for example, it is possible to produce high-grade images, at high resolution for image-data changing points or halftone-spot images of relatively low halftone-spot cycles per inch (coarse halftone-spot images), smooth and stable for photographs, portions in which image data changes gently, or halftone-spot images of high halftone-spot cycles per inch (fine halftone-spot images), and in which these different regions match each other without sense of incongruity.

Specifically, for a portion in an image in which change of image data is sharp and the edge level is the level 0 (where the edge degree is highest) such as an edge portion of a character or a line drawing, the quantization threshold generated by the quantization threshold generating part 1140 is fixed to +128. Thereby, a true or pure error diffusion method is used for quantization using the fixed threshold in the error diffusion processing part 1120. Accordingly, it is possible to form a high-resolution image.

For a portion such as a photograph or a flat portion of an image in which the edge degree is low (the edge level is high), the oscillation range of the quantization threshold generated by the quantization threshold generating part 1140 is wide. Accordingly, the quantization processing of the error diffusion processing part 1120 is processing mainly according to the dithering technique in which dots are concentrated. Thereby, the image data is converted to form halftone spots at the dither threshold cycles, and an image based on dithering having superior graininess and stability is formed.

Because the dither threshold matrix having the threshold arrangement shown in FIG. 27A or 27B is used for generation of quantization thresholds, output dots develop spirally from the central portion in each dither threshold cycle as the shade level of image data increases.

Figure 33:
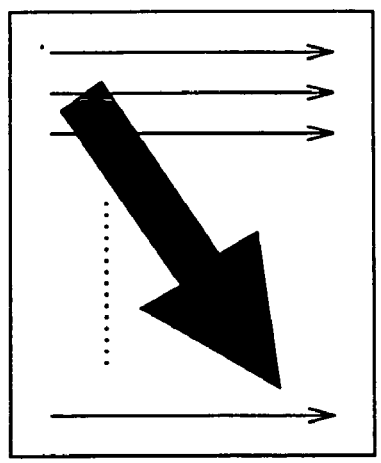
FIG. 33 shows an ordinary error diffusion processing direction.

When an original image is read by a scanner, main scanning is made rightward, as indicated by thin arrows shown in FIG. 33, and sub-scanning is made downward, ordinarily. Then, image data is input in the order of reading, and, thereby, the direction of quantization processing by the error diffusion processing part 1120, that is, the direction of propagation of quantization errors is the direction from the top left to the bottom right as indicated by the thick arrow shown in FIG. 33.

In this case, the quantization threshold table shown in FIG. 27A is used by the fluctuating value generating part 1141. Thereby, for an image flat portion, the quantization thresholds shown in FIG. 29 are generated in a dither threshold cycle of 4 pixels×4 pixels. Accordingly, output dots are generated in the order shown in FIG. 28. That is, the output dots (halftone spot)develop spirally clockwise from the inside to the outside. The states of development of dots in a light-shade (low-shade) portion, a medium-shade portion and a dark-shade (high-shade) portion of an image are shown in FIGS. 30, 31 and 32, respectively.

Figure 30:
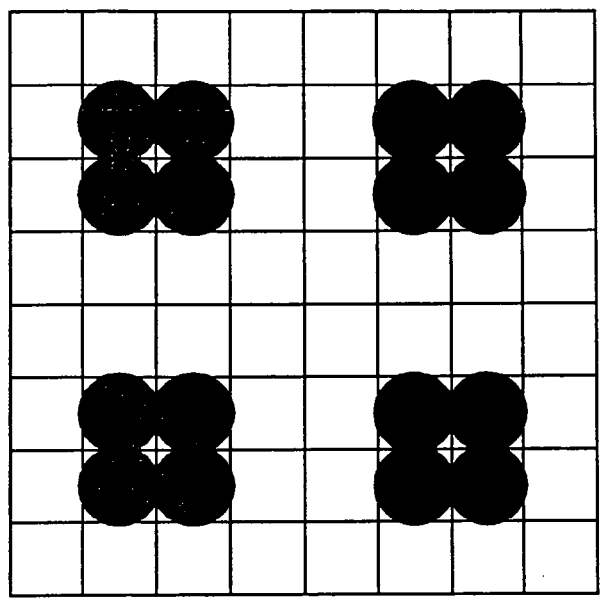
FIGS. 30, 31 and 32 show states of development of output dots for a low-shade portion, a medium-shade portion and a high-shade portion, respectively, when the dither threshold matrix shown in FIG. 27A is used, according to the present invention.
Figure 31:
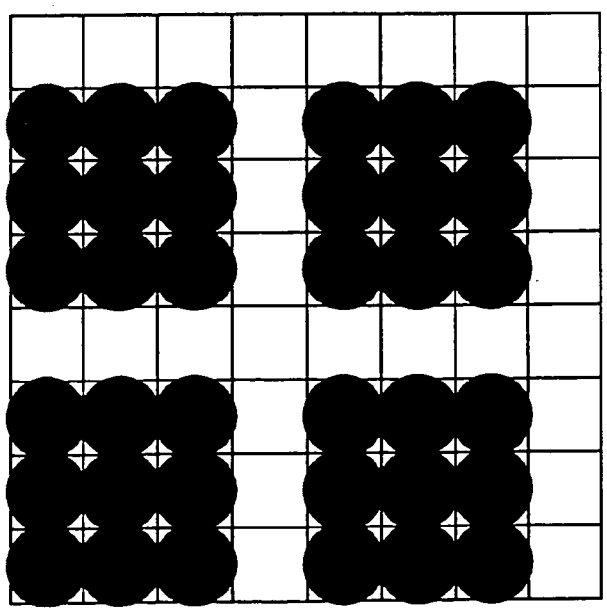
Figure 32:
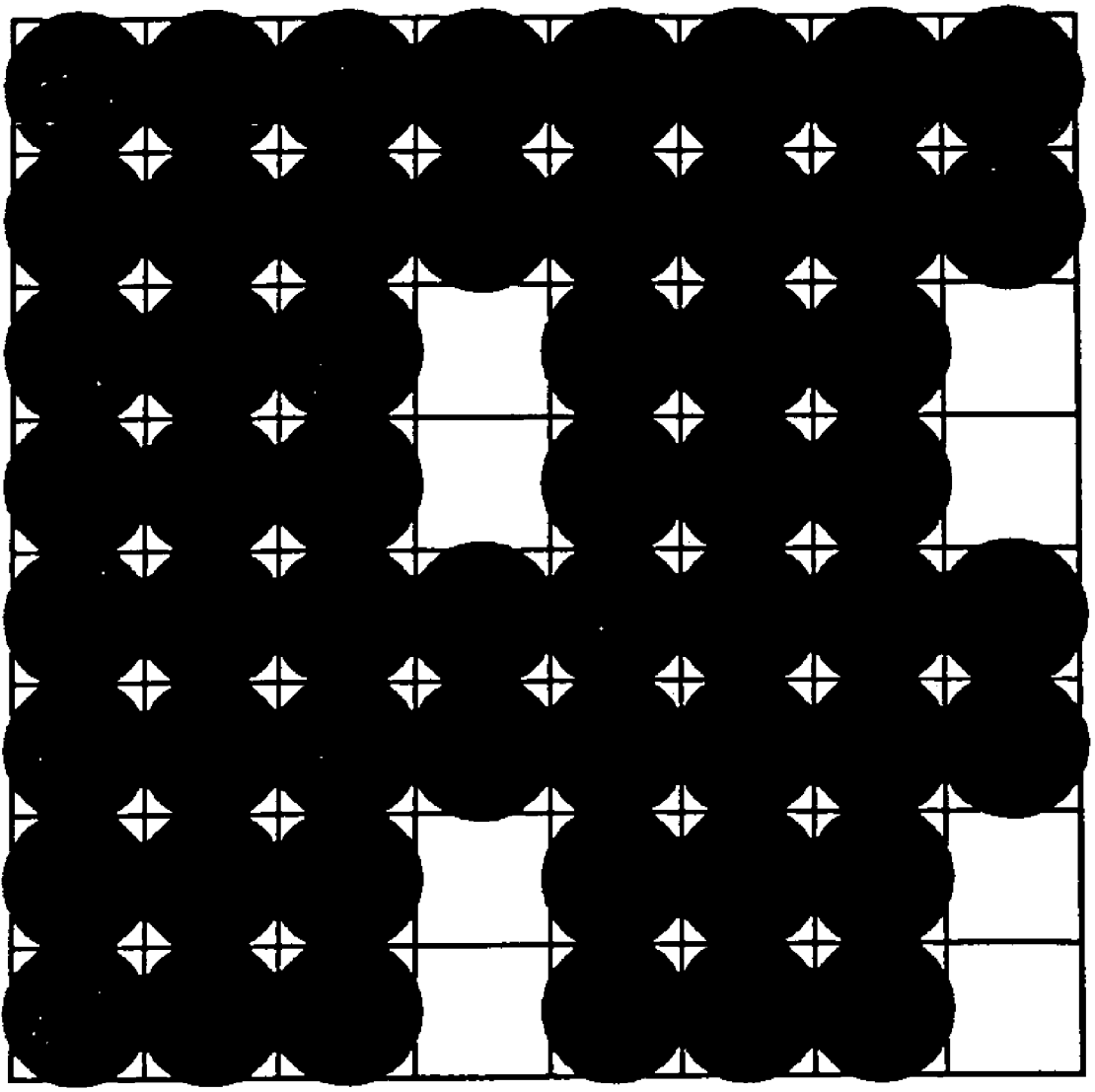

As shown in FIGS. 30 and 31, the output dots concentrate in the light and medium-shade portions, and the output dots of adjacent dither threshold cycles do not come into contact with one another. Accordingly, it is possible to form images in which graininess is satisfactory and stability is superior in light-shade and medium-shade image flat portions.

Further, in the central portion of the dither threshold matrix, the thresholds are arranged in such a manner that the threshold increases in the sub-scanning direction with priority. Specifically, in light-shade portions, as can be seen from FIG. 28, output dots develop upward first, and, then, develop downward. Accordingly, in light-shade portions, dots develop in the sub-scanning direction with priority (vertical-based dot development).

When such a dot development manner that dots develop in the sub-scanning direction with priority is applied, especially in a case where the application is made to image formation by a electrophotographic printer, noise due to causes other than image processing such as banding is not likely to adversely affects, in comparison to a case where dots develop in the main scanning direction with priority (horizontal-based dot development), and, thereby, high-grade images superior in stability can be formed.

Figure 34:
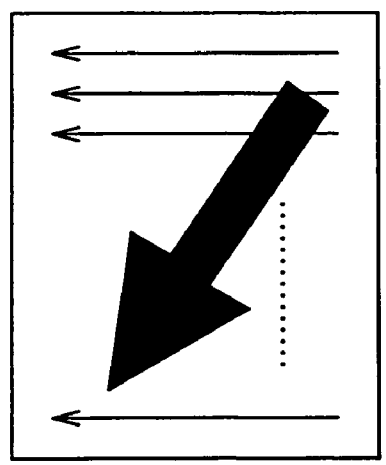
FIG. 34 shows another error diffusion processing direction.

When an original image is read where main scanning is made leftward, as indicated by thin arrows shown in FIG. 34, and sub-scanning is made downward and image data is input in the order of reading, the direction of quantization processing by the error diffusion processing part 1120, that is, the direction of propagation of quantization errors is the direction from the top right to the bottom left as indicated by the thick arrow shown in FIG. 34.

In this case, the quantization threshold table shown in FIG. 27B is used by the fluctuating value generating part 1141. Thereby, for an image flat portion, the quantization thresholds shown in FIG. 36 are generated in a dither threshold cycle of 4 pixels×4 pixels. Accordingly, output dots are generated in the order shown in FIG. 35. Thus, output dots (halftone spot) develop spirally counterclockwise.

In quantization processing by the error diffusion method, positions at which dots are generated shift due to effect of diffusion of quantization errors. Accordingly, output dots may not develop in light or medium-shade portions as described above. However, when output dots are caused to develop clockwise when quantization processing is made from the top left to the bottom right and when output dots are caused to develop counterclockwise when quantization processing is made from the top right to the bottom left as described above according to the present invention, neat dot concentration is likely to be made in each dither threshold cycle, due to relationship with propagation direction characteristics of quantization errors, and, thereby, stability and graininess in light and medium-shade portions are improved.

Further, at a boundary between a region in which the edge degree is high and a region in which the edge degree is low, the oscillation range of the quantization threshold changes gradually according to the edge degree. Thereby, the characteristics of the processing is smoothly switched from the processing mainly according to the error diffusion technique to the processing mainly according to the dithering technique, and vise versa. Accordingly, it is possible to form images in which there is no incongruousness in boundaries between both image regions.

The region expansion processing part 1132 of the image characteristics extracting part 1130 performs region expansion processing of the extent of 7 pixels. In the case of 600 dpi, the expansion extent of the above-mentioned 7 pixels of the region expansion processing corresponds to approximately 0.3 mm on the original image, and this corresponds to the halftone-spot cycles per inch (image space frequency) of approximately 86 Lpi (lines per inch). Accordingly, through the region expansion processing, a fine halftone-spot image higher than 86 Lpi is evaluated as an edge portion, and, therefor, processing mainly according to the error diffusion technique using a fixed quantization threshold or a oscillating quantization threshold in a narrow oscillation range is performed in the error diffusion processing part 1120. Thereby, it is possible to reproduce halftone spots faithfully with high resolution, and to prevent moiré patterns from being generated.

As described above, halftone-spot components of high halftone-spot cycles per inch equal to or higher than 175 Lpi are not left in the smoothed image data 1100. Accordingly, for halftone-spot images of such high halftone-spot cycles per inch, the edge level is the level 8 or high level (very low edge degree). Thereby, they are processed mainly according to the dithering technique using oscillating quantization threshold in a wide oscillation range same as for image flat portions. Thereby, they are converted into halftone spots at the dither threshold cycles (150 Lpi). Accordingly, it is possible to form images superior in graininess and stability. Further, because halftone-spot components are previously removed from the image data 1100, no moiré patterns are generated.

For halftone-spot images of low halftone-spot cycles per inch lower than 86 Lpi, halftone-spot boundary portions evaluated as edges are processed mainly according to the error diffusion technique using fixed quantization thresholds or oscillating quantization thresholds in narrow oscillation ranges. Accordingly, the contours of the halftone spots are reproduced faithfully, and also, moiré patterns are prevented from being generated. Further, halftone-spot central portions not evaluated as edges are processed mainly according to the dithering technique using oscillating quantization thresholds in wide oscillation ranges. Accordingly, it is possible to express these portions with satisfactory stability and graininess.

A sixteenth embodiment of the present invention will now be described.

In the sixteenth embodiment of the present invention, in an image processing apparatus having the configuration shown in FIG. 16, the fluctuating value generating part 1141 of the dither threshold generating part 1140 uses the 8×8 dither threshold matrix shown in FIG. 37, and generates a dither threshold oscillating in image space cyclically between −7 and +8. The other configuration is the same as that of the above-described seventh embodiment.

The dither threshold matrix shown in FIG. 37 is obtained as a result of the 4×4 basic dither thresholds enclosed by the thick line (the same as the dither threshold matrix shown in FIG. 27A) being copied and four of them being combined, and thus the basic dither threshold matrix being magnified to a 8×8 size. In the arrangement, the basic dither matrixes adjacent in the main scanning direction are shifted in the sub-scanning direction relatively by the half phase.

By using such a dither threshold matrix, for image flat portions for which processing mainly based on dithering technique is performed, where halftone spots corresponding to 150 Lpi are formed in 600 dpi, because halftone-spot development starting points are arranged staggeringly, it is possible to form images superior in stability especially for light-shade portions.

Figure 38:
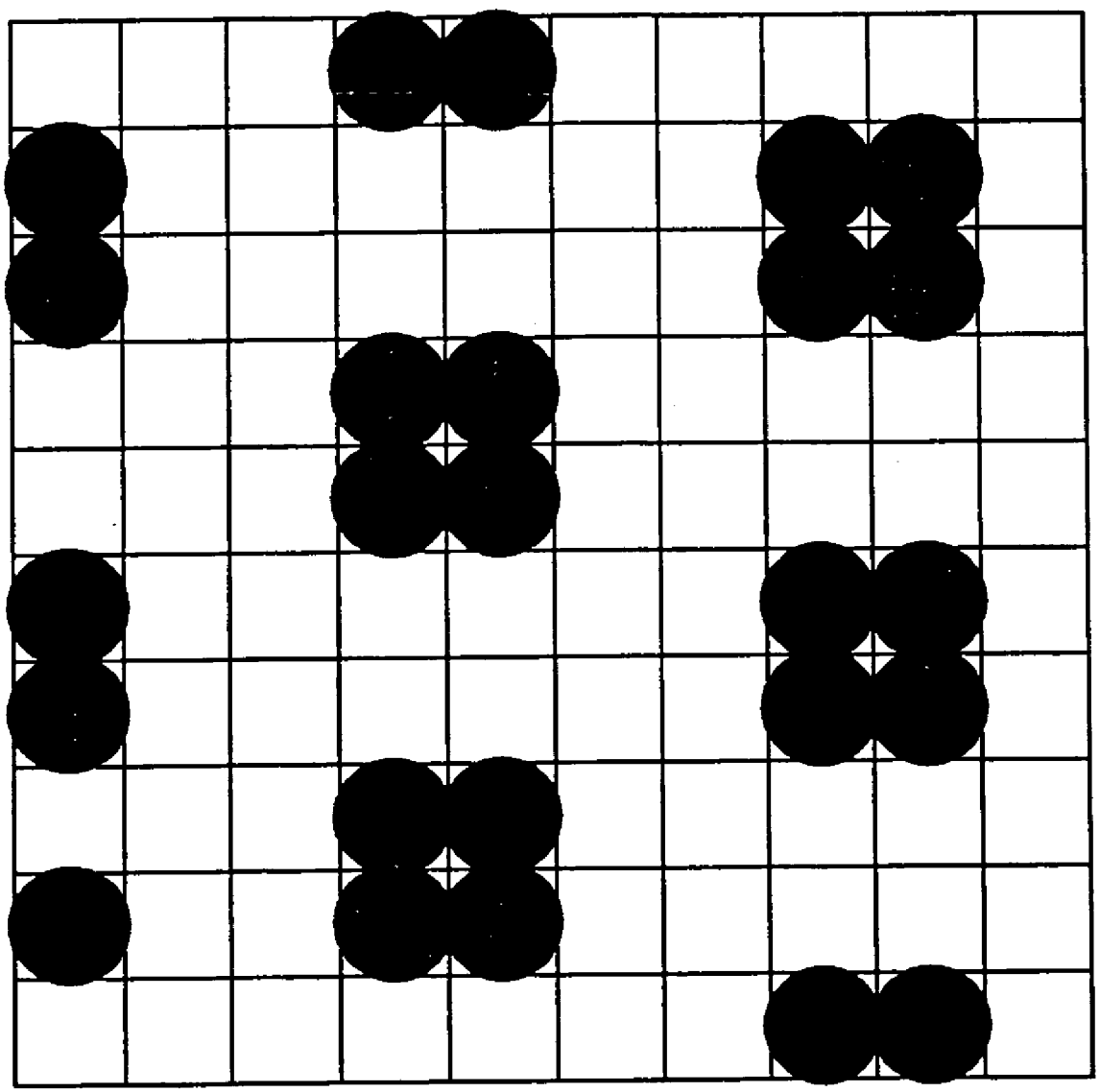
FIGS. 38, 39 and 40 show states of development of output dots for a low-shade portion, a medium-shade portion and a high-shade portion, respectively, when the dither threshold matrix shown in FIG. 37 is used, according to the present invention.
Figure 39:
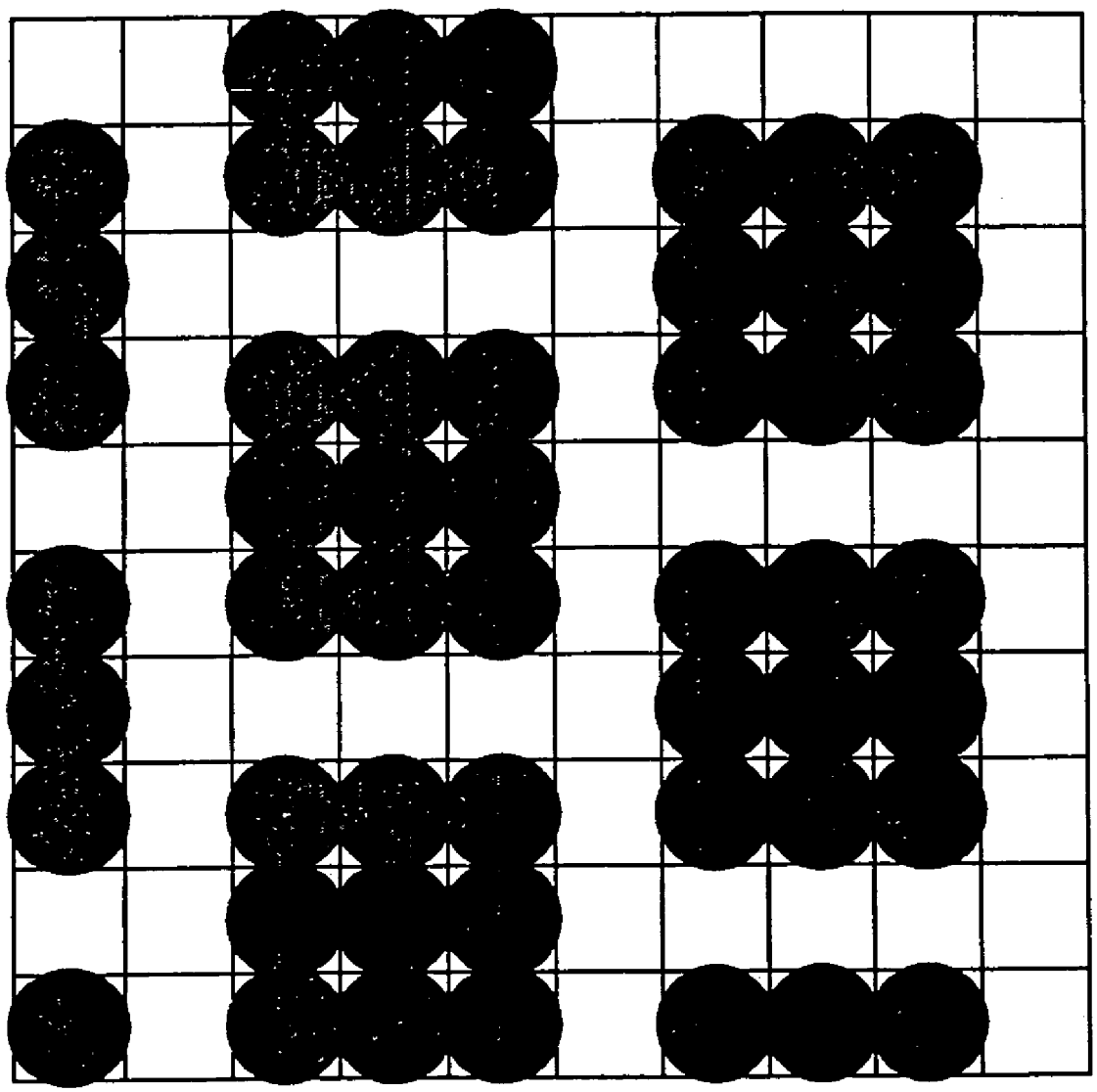
Figure 40:
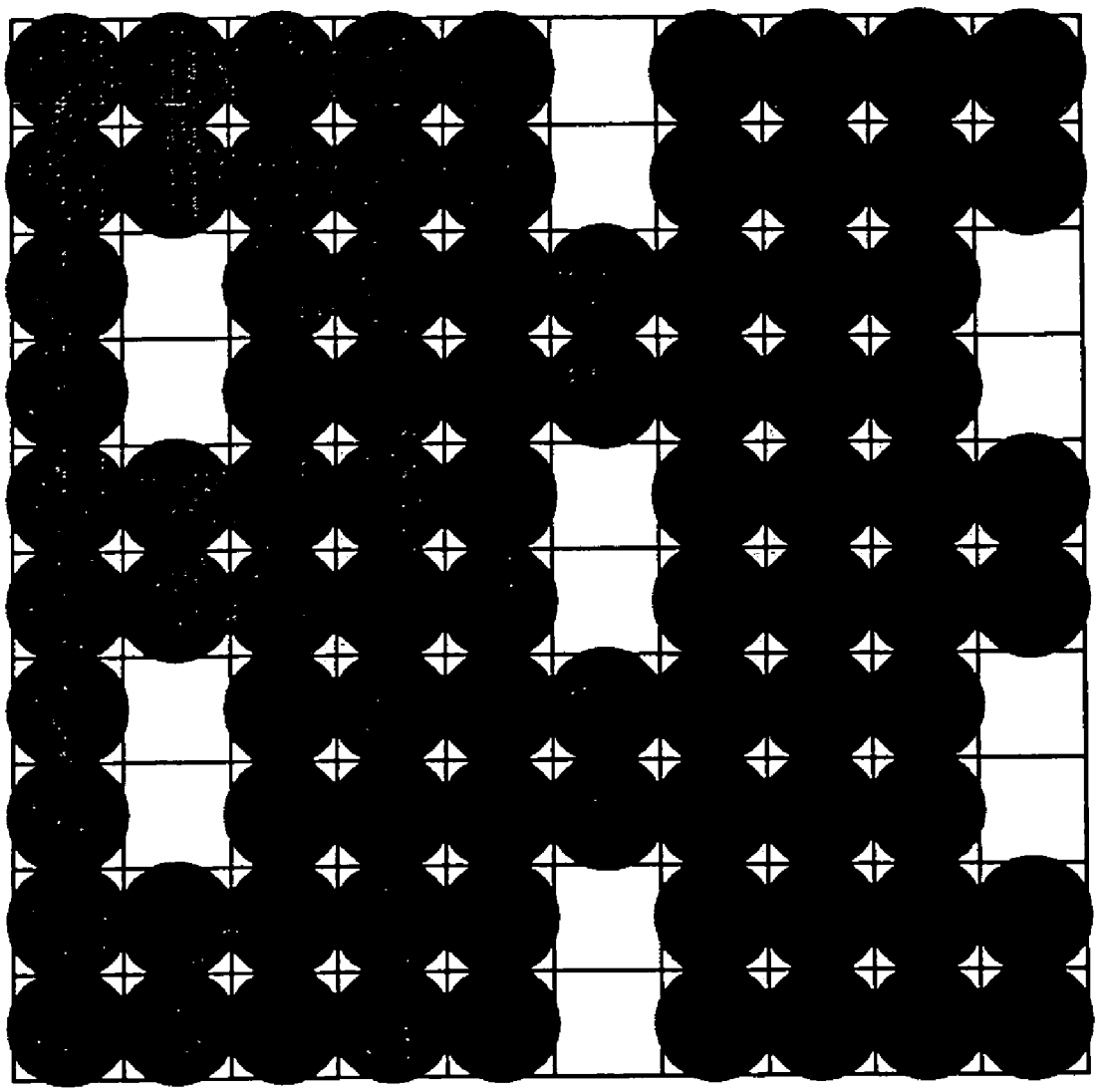

When such a dither threshold matrix is used, for image flat portions for which processing mainly based on the dithering technique is performed, halftone-spot arrangements such as those shown in FIGS. 38, 39 and 40 are obtained for light-shade, medium-shade and dark-shade portions, respectively, and the screen angle of approximately 63.5° is formed. Accordingly, such a dither threshold matrix is suited for error diffusion processing, causes no deformation of halftone spots, and provides satisfactory graininess.

The dither threshold generating part 1141 does not necessarily need to have a ROM storing the 8×8 dither threshold matrix shown in FIG. 37, but may have a ROM storing the 4×4 dither threshold matrix, and may generate the thresholds of the 8×8 dither threshold matrix shown in FIG. 37 by controlling reading addresses.

A seventeenth embodiment of the present invention will now be described.

In the seventeenth embodiment, in an image processing apparatus having the configuration shown in FIG. 16, the fluctuating value generating part 1141 of the dither threshold generating part 1140 uses the 4×4 dither threshold matrix shown in FIG. 41 in which the thresholds from −7 to +2 are arranged in a manner such that the thresholds are arranged spirally clockwise in the ascending order of the thresholds, and the thresholds more than 2 are arranged in a manner such that the thresholds are dispersed radially in the ascending order of the thresholds, and generates a dither threshold oscillating in image space cyclically between −7 and +8. The other configuration is the same as that of the above-described seventh embodiment.

Figure 43A:
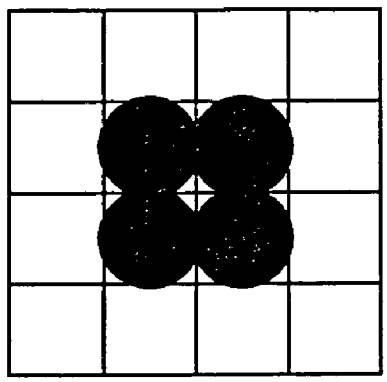
FIGS. 43A, 43B and 43C show states of development of output dots for a low-shade portion, a medium-shade portion and a high-shade portion, respectively, when the dither threshold matrix shown in FIG. 41 is used, according to the present invention.
Figure 43B:
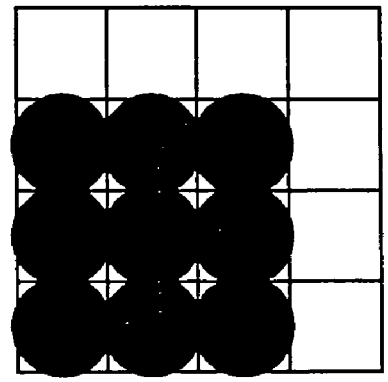

When this dither threshold matrix is used, for image flat portions for which processing mainly based on dithering technique is performed, the quantization thresholds shown in FIG. 42 are generated in a dither threshold cycle. Accordingly, states of output dot development for light-shade, medium-shade and dark-shade portions are those shown in FIGS. 43A, 43B and 43C.

Figure 43C:
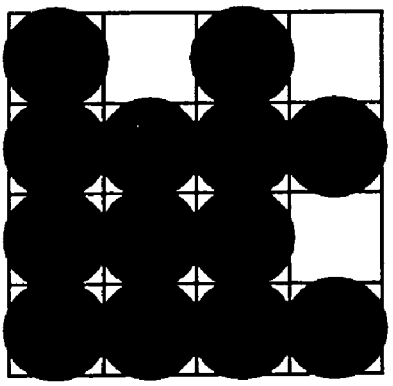

As shown in FIG. 43C, output dots develop dispersedly in the periphery of a dither threshold cycle. Accordingly, as is obvious from comparison with FIG. 32, a white blank remaining phenomenon occurring in a dark-shade allover painted portion can be relieved. Further, in light or medium-shade portions, concentration of dots is positively made.

Accordingly, it is possible to form high-grade images superior in stability and in which white blank remaining phenomena are not remarkable.

An eighteenth embodiment of the present invention will now be described.

In the eighteenth embodiment, in an image processing apparatus having the configuration shown in FIG. 16, the fluctuating value generating part 1141 of the dither threshold generating part 1140 uses the 4×4 dither threshold matrix shown in FIG. 44 in which the thresholds from −7 to −4 are arranged in the central portion concentratedly and the thresholds from −3 to +8 are arranged in the periphery so as to disperse radially, and generates a dither threshold oscillating in image space cyclically between −7 and +8. The other configuration is the same as that of the above-described seventh embodiment.

When this dither threshold matrix is used, for image flat portions for which processing mainly based on dithering technique is performed, output dots are generated in the order shown in FIG. 45. That is, for light-shade portions, output dots develop concentratedly in the central portion of each dither threshold cycle, and, for medium or dark-shade portions, output dots develop radially. Because output dot development is made in such a manner, the center of each halftone spot formed is located approximately at the center of a respective dither threshold cycle, through from light-shade portions to dark-shade portions. Accordingly, shift of halftone spots is reduced. Thereby, smooth and high-grade image which are not likely to be adversely affected by change in shade can be formed.

A nineteenth embodiment of the present invention will now be described.

Figure 46:
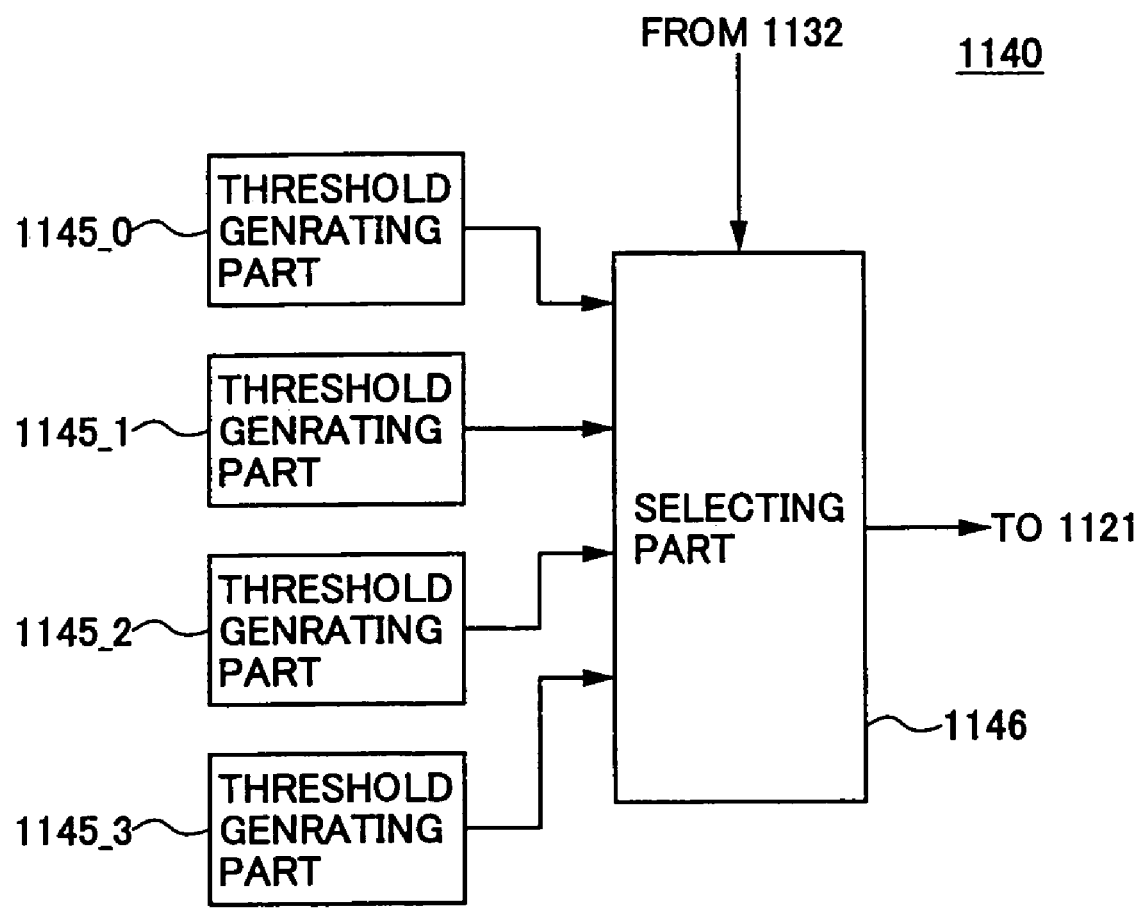
FIG. 46 shows a block diagram of one example of a quantization threshold generating part according to the present invention.

In the nineteenth embodiment, in an image processing apparatus having the configuration shown in FIG. 16, the quantization threshold generating part 1140 has the configuration shown in FIG. 46.

Further, the image change detecting part 1131 of the image characteristics extracting part 1130 (FIG. 16) is changed so as to quantize the edge amount into 2-bit edge data which can represent 4 edge levels from the level 0 (the highest edge degree)to the level 3 (non edge).

In the nineteenth embodiment, the quantization threshold generating part 1140 includes four threshold generating parts 1145_0 through 1145_3 which generate fluctuating values having oscillation ranges corresponding to the respective levels 0 through 3 of the edge degree, respectively, and a selecting part 1146 which selects one of these fluctuating values generated by the threshold generating parts 1145_0 through 1145_3 according to the edge level indicated by the edge data input from the image characteristics extracting part 1130, and provides the selected fluctuating value to the quantizer 1121 of the error diffuison processing part 1120 (FIG. 16) as the quantization threshold.

The threshold generating part 1145_3 corresponding to the edge level 3 (non edge) uses the dither threshold matrix obtained from multiplying each threshold of the dither threshold matrix used in any of the above-described fifteenth, sixteenth, seventeenth and eighteenth embodiments (FIGS. 27A, 27B, 37, 41 and 44) by 8, and then, adding 128 thereto, and generates the threshold oscillating in the maximum oscillating range.

The threshold generating part 1145_2 corresponding to the edge level 2 uses the dither threshold matrix obtained from multiplying each threshold of that dither threshold matrix in the above-described embodiment by 5, and then, adding 128 thereto, and generates the threshold oscillating in the smaller oscillating range.

The threshold generating part 1145_1 corresponding to the edge level 1 uses the dither threshold matrix obtained from multiplying each threshold of that dither threshold matrix in the above-described embodiment by 2, and then, adding 128 thereto, and generates the threshold oscillating in the further smaller oscillating range.

The threshold generating part 1145_0 corresponding to the edge level 0 (the highest edge degree) generates the fixed value (+128).

Accordingly, also in the nineteenth embodiment, it is obvious that, the same quantization threshold generating processing as that of any of the fifteenth, sixteenth, seventeenth and eighteenth embodiments is performed, and, thereby, high-grade images can be formed.

In the nineteenth embodiment, it is possible to eliminate a part for multiplication processing (corresponding to the multiplying part 1142 shown in FIG. 16) which is disadvantageous in view of costs and processing time whether the quantization threshold generating part 1140 is achieved by hardware or software.

Further, although the region expansion processing part 1132 needs to temporarily store the edge data for the plurality of lines corresponding to the region expansion extent, it is possible to reduce the capacity of line memories or the like for the temporarily storage as the edge data is reduced to 2-bit data.

Furthermore, because the number of edge degree levels is small, i.e., 4, the memory amount needed for the threshold generating dither threshold tables in the threshold generating parts 1145_0 through 1145_3 is small.

Further, although the storage capacity of the region expansion processing part 1132 is not reduced, it is also possible that the edge detecting part 1131 outputs the nine edge levels, and the nine edge levels are converted into four levels in the region expansion processing part 1132 and are output therefrom.

Each of the above-described fifteenth, sixteenth, seventeenth, eighteenth and nineteenth embodiments may be achieved by software using a general-purpose computer such as that shown in FIG. 13.

In this case, a program for achieving the functions of the respective part of the image processing apparatus is read from one of various recording medium such as a floppy disk, an optical disk, a magneto-optical disk, a semiconductor storage device, and so forth through an appropriate drive device, or received from an external computer via a network through a communication device, is then loaded in a main memory, and is then executed by a CPU.

Accordingly, it is possible to achieve the image processing apparatus by the general-purpose computer. Storage areas of the main memory may be used as line memories and so forth necessary for storing signals, and signal delay, for example.

Such various computer-readable recording media (floppy disk, optical disk, magneto-optical disk, semiconductor storage device, and so forth) in which such a program is recorded are included in the present invention.

The image processing apparatus in any of the above-described fifteenth, sixteenth, seventeenth, eighteenth and nineteenth embodiments may be incorporated in apparatuses relating to image formation such as a printer, a display and so forth, apparatuses relating to image reading such as a scanner, a facsimile machine, and so forth, and apparatuses relating both to image reading and image formation such as a digital copier and so forth.

As one example thereof, a digital copier to which the above-mentioned embodiment of the present invention is applied will now be described (as a twentieth embodiment of the present invention).

The general sectional view of the digital copier in the twentieth embodiment is the same as that shown in FIG. 14, and all the parts/components thereof are the same as those shown in FIG. 16, the description thereof being omitted. However, the circuit part 550 of the sixth embodiment is replaced by a circuit part 1550 (FIG. 26) in the twentieth embodiment.

FIG. 26 shows a simplified block diagram of one example of the circuit part 1550 of this digital copier.

The circuit part 1550 is the same as the circuit part 550 shown in FIG. 15 except that the error diffusion processing part 110, image data change detecting part 120, quantization threshold generating part 130 and signal delaying part 140 are replaced by a halftone processing part 1560. The same reference numerals are given to the same parts as those of FIG. 15, and description thereof is omitted.

The halftone processing part 1560 is the image processing apparatus in any of the above-described fifteenth, sixteenth, seventeenth, eighteenth and nineteenth embodiments.

The image data having undergone the filter processing performed by the filter processing circuit 554 is input to the image characteristics extracting part 1130. The image data having undergone the γ correction performed by the γ correction circuit 555 is input to the error diffusion processing part 1120 via the signal delaying part 1150. The quantized data output from the error diffusion processing part 1120 is sent to the light emitting control part of the semiconductor laser in the writing optical unit 508.

It is possible to omit the signal delaying part 1150 as a result of the filter processing circuit 554 adjusting timing of the signal to be output to the image characteristics extracting part 1130.

Further, in the digital copier, size changing processing of image data in the main scanning direction may be performed antecedent to the γ correction circuit 555, for example, background removal processing and/or flare removal processing may be performed between the γ correction part 555 and halftone processing part 1560, for example, and/or 90° rotation processing may be performed antecedent to the filter processing part 554 or subsequent to the halftone processing part 1560, for example, description thereof being omitted.

The present invention is not limited to the above-described embodiments, and variations and modifications may be made without departing from the scope of the present invention.

The present application is based on Japanese priority applications Nos. 11-309413, 2000-106451 and 2000-106452, filed on Oct. 29, 1999, Apr. 7, 2000 and Apr. 7, 2000, respectively, the entire contents of which are hereby incorporated by reference.

What is claimed is:

1. An image processing apparatus comprising:
an error diffusion processing part which quantizes multi-tone image data by an error diffusion method;
a quantization threshold generating part which uses a dither threshold matrix and generates a quantization threshold for said error diffusion processing part, the quantization threshold oscillating cyclically; and
an edge detecting part detecting an edge level of the image data input to said error diffusion processing part,
wherein said error diffusion processing part controls an oscillation range of the quantization threshold according to the edge level detected by said edge detecting part, and, also, switches the dither threshold matrix used for generation of the quantization threshold according to a mode specified externally.

2. An image processing apparatus comprising:
an error diffusion processing part which quantizes multi-tone image data by an error diffusion method;
a quantization threshold generating part which uses a dither threshold matrix and generates a quantization threshold for said error diffusion processing part, the quantization threshold oscillating cyclically;
an edge detecting part detecting an edge level of the image data input to said error diffusion processing part; and
a region expansion processing part performing region expansion processing on the edge level detected by said edge detecting part,
wherein said error diffusion processing part controls an oscillation range of the quantization threshold according to the edge level having undergone the region expansion processing performed by said region expansion processing part, and, also, switches the dither threshold matrix used for generation of the quantization threshold according to a mode specified externally.

3. A computer readable recording medium in which a program is recorded, the program being read therefrom and executed by a computer so as to cause said computer to perform the functions of:
an error diffusion processing part which quantizes multi-tone image data by an error diffusion method;
a quantization threshold generating part which uses a dither threshold matrix and generates a quantization threshold for said error diffusion processing part, the quantization threshold oscillating cyclically; and
an edge detecting part detecting an edge level of the image data input to said error diffusion processing part,
wherein said error diffusion processing part controls an oscillation range of the quantization threshold according to the edge level detected by said edge detecting part, and, also, switches the dither threshold matrix used for generation of the quantization threshold according to a mode specified externally.

4. A computer readable recording medium in which a program is recorded, the program being read therefrom and executed by a computer so as to cause said computer to perform the functions of:
an error diffusion processing part which quantizes multi-tone image data by an error diffusion method;
a quantization threshold generating part which uses a dither threshold matrix and generates a quantization threshold for said error diffusion processing part, the quantization threshold oscillating cyclically;
an edge detecting part detecting an edge level of the image data input to said error diffusion processing part; and
a region expansion processing part performing region expansion processing on the edge level detected by said edge detecting part,
wherein said error diffusion processing part controls an oscillation range of the quantization threshold according to the edge level having undergone the region expansion processing performed by said region expansion processing part, and, also, switches the dither threshold matrix used for generation of the quantization threshold according to a mode specified externally.

* * * * *